(12) United States Patent
Watanabe et al.

(10) Patent No.: US 12,544,917 B2
(45) Date of Patent: Feb. 10, 2026

(54) DEVICE FOR ACQUIRING POSITIONAL RELATIONSHIP BETWEEN ROBOT AND WORKING MACHINE, CONTROL DEVICE, SYSTEM, METHOD, AND COMPUTER PROGRAM

(71) Applicant: Fanuc Corporation, Yamanashi (JP)

(72) Inventors: Toshiro Watanabe, Yamanashi (JP); Masahiro Morioka, Yamanashi (JP); Kenichiro Abe, Yamanashi (JP); Seigo Kato, Yamanashi (JP); Hiroyuki Uchida, Yamanashi (JP); Zheng Tong, Yamanashi (JP); Masanori Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 246 days.

(21) Appl. No.: 18/027,748

(22) PCT Filed: Sep. 28, 2021

(86) PCT No.: PCT/JP2021/035679
§ 371 (c)(1),
(2) Date: Mar. 22, 2023

(87) PCT Pub. No.: WO2022/071333
PCT Pub. Date: Apr. 7, 2022

(65) Prior Publication Data
US 2023/0373083 A1  Nov. 23, 2023

(30) Foreign Application Priority Data
Sep. 30, 2020  (JP) .................. 2020-165446

(51) Int. Cl.
*B25J 9/16*  (2006.01)

(52) U.S. Cl.
CPC ........... *B25J 9/1628* (2013.01); *B25J 9/1682* (2013.01)

(58) Field of Classification Search
CPC ...... B25J 9/1628; B25J 9/1682; B25J 9/1692; B25J 9/1664; G05B 19/425;
(Continued)

(56) References Cited

U.S. PATENT DOCUMENTS

| 9,969,090 B2 | 5/2018 | Warashina et al. |
| 2003/0200042 A1* | 10/2003 | Gan .................. B25J 9/1692 702/105 |

(Continued)

FOREIGN PATENT DOCUMENTS

| JP | 05111897 A | 5/1993 |
| JP | 2003114706 A * | 4/2003 |

(Continued)

OTHER PUBLICATIONS

International Search Report and Written Opinion for International Application No. PCT/JP2021/035679, dated Dec. 21, 2021, 6 pages.

(Continued)

*Primary Examiner* — Dylan M Katz
(74) *Attorney, Agent, or Firm* — BUCHANAN INGERSOLL & ROONEY PC

(57) ABSTRACT

A device for acquiring a positional relationship between a robot coordinate system set in a robot and a working machine coordinate system set in a working machine installed outside the robot, includes a position data acquisition unit that acquires, when a finger part of the robot is placed in a predetermined position and posture with respect to the working machine, first position data indicating the position and posture of the finger part with respect to the robot coordinate system, and second position data indicating the position and the posture of the finger part with respect to (Continued)

the working machine coordinate system; and a positional relationship acquisition unit that acquires third position data indicating the positional relationship using the first position data and the second position data.

17 Claims, 24 Drawing Sheets

(58) Field of Classification Search
CPC ........... G05B 2219/37284; G05B 2219/40582; G05B 2219/40586; G05B 2219/40599
See application file for complete search history.

(56) References Cited

U.S. PATENT DOCUMENTS

2014/0277720 A1  9/2014  Izumi et al.
2020/0147787 A1* 5/2020  Takahashi .............. B25J 13/085

FOREIGN PATENT DOCUMENTS

| JP | 2010076054 A | 4/2010 |
| JP | 2011-230238 A | 11/2011 |
| JP | 2014176940 A | 9/2014 |
| JP | 2017071001 A | 4/2017 |

OTHER PUBLICATIONS

Office Action (Notice of Reasons for Refusal) issued Jun. 18, 2024, by the Japan Patent Office in corresponding Japanese Patent Application No. 2022-554024 and an English translation of the Office Action. (8 pages).

* cited by examiner

DEVICE FOR ACQUIRING POSITIONAL RELATIONSHIP BETWEEN ROBOT AND WORKING MACHINE, CONTROL DEVICE, SYSTEM, METHOD, AND COMPUTER PROGRAM

CROSS REFERENCE TO RELATED APPLICATIONS

This is the U.S. National Phase application of PCT/JP2021/035679, filed Sep. 28, 2021, which claims priority to Japanese Patent Application No. 2020-165446, filed Sep. 30, 2020, the disclosures of each of these applications being incorporated herein by reference in their entireties for all purposes.

FIELD OF THE INVENTION

The present invention relates to a device, a control device, a system, a method, and a computer program for acquiring a positional relationship between a robot and a working machine.

BACKGROUND OF THE INVENTION

In a known technique, a robot touches up a plurality of points set to a working machine that holds a workpiece, to acquire a relative position between the working machine and the robot (e.g., Patent Literature 1).

PATENT LITERATURE

Patent Literature 1: JP 2010-76054 A

SUMMARY OF THE INVENTION

There has been a demand for a technique enabling data indicating the positional relationship between a robot and a working machine to be more easily acquired.

According to one aspect of the present disclosure, a device configured to acquire a positional relationship between a robot coordinate system set for a robot and a working machine coordinate system set for a working machine disposed outside the robot includes a position data acquisition section configured to acquire first position data indicating a position and orientation of a hand-tip portion of the robot relative to the robot coordinate system and second position data indicating a position and orientation of the hand-tip portion relative to the working machine coordinate system, when the hand-tip portion is arranged at a predetermined position and orientation relative to the working machine, and a positional relationship acquisition section configured to acquire the positional relationship based on the first position data and the second position data.

According to another aspect of the present disclosure, a device configured to acquire a positional relationship between a robot and a working machine is configured to acquire the positional relationship based on a position and orientation of the robot relative to the working machine when the robot comes into contact with a contact portion provided at a known position relative to the working machine.

According still another aspect of the present disclosure, a method of acquiring a positional relationship between a robot coordinate system set for a robot and a working machine coordinate system set for a working machine disposed outside the robot includes acquiring first position data indicating a position and orientation of a hand-tip portion of the robot relative to the robot coordinate system and second position data indicating a position and orientation of the hand-tip portion relative to the working machine coordinate system, when the hand-tip portion is arranged at a predetermined position and orientation relative to the working machine, and acquiring the positional relationship based on the first position data and the second position data.

According to still another aspect of the present disclosure, a method of acquiring a positional relationship between a robot and a working machine includes acquiring the positional relationship based on a position and orientation of the robot relative to the working machine when the robot comes into contact with a contact portion provided at a known position relative to the working machine.

According to still another aspect of the present disclosure, a computer program configured to, in order to acquire a positional relationship between a robot coordinate system set for a robot and a working machine coordinate system set for a working machine disposed outside the robot, cause a processor to function as a position data acquisition section configured to acquire first position data indicating a position and orientation of a hand-tip portion of the robot relative to the robot coordinate system and second position data indicating a position and orientation of the hand-tip portion relative to the working machine coordinate system, when the hand-tip portion is arranged at a predetermined position and orientation relative to the working machine, and a positional relationship acquisition section configured to acquire the positional relationship based on the first position data and the second position data.

According to the present disclosure, third position data indicating a positional relationship between a robot coordinate system (i.e., a robot) and a working machine coordinate system (i.e., a working machine) can be acquired, with a hand-tip portion of the robot being arranged at one position and in one orientation. Thus, the process of obtaining the positional relationship between the robot coordinate system and the working machine coordinate system can be largely simplified.

DETAILED DESCRIPTION OF EMBODIMENTS OF THE INVENTION

Figure 1:
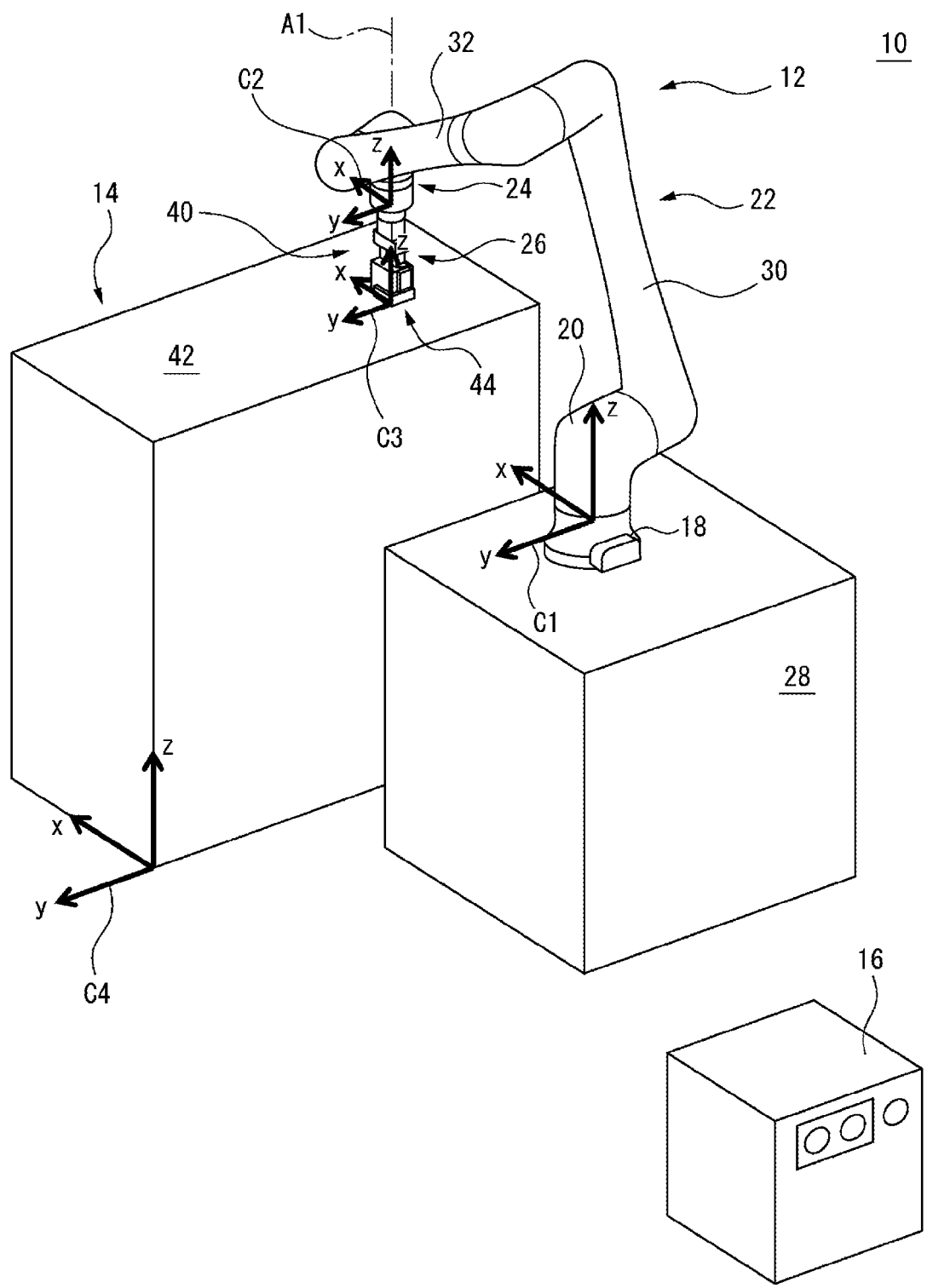
FIG. 1 is a perspective view of a system according to one embodiment.

Hereinafter, embodiments of the present disclosure are described in detail with reference to the drawings. In various embodiments described below, the same elements are denoted by the same reference signs, and redundant description will be omitted. First, a system 10 according to one embodiment will be described with reference to FIG. 1 and FIG. 2. The system 10 includes a robot 12, a working machine 14, and a control device 16.

In the present embodiment, the robot 12 is a vertical articulated robot (e.g., a six-axis robot) and includes a robot base 18, a swivel body 20, a robot arm 22, a wrist 24, and an end effector 26. The robot base 18 is fixed to a support mechanism 28. The support mechanism 28 may be, for example, a platform fixed to a floor of a work cell, a traveling device self-propelled within the work cell, or a hand carriage manually moved by an operator.

The swivel body 20 is mounted on the robot base 18 to be swivelable about a vertical axis. The robot arm 22 includes a lower arm 30 provided to the swivel body 20 to be rotatable about a horizontal axis, and an upper arm 32 rotatably provided at a leading end portion of the lower arm 30. The wrist 24 is rotatably provided at a leading end portion of the upper arm 32 and turns the end effector 26 about a wrist axis A1.

Figure 3:
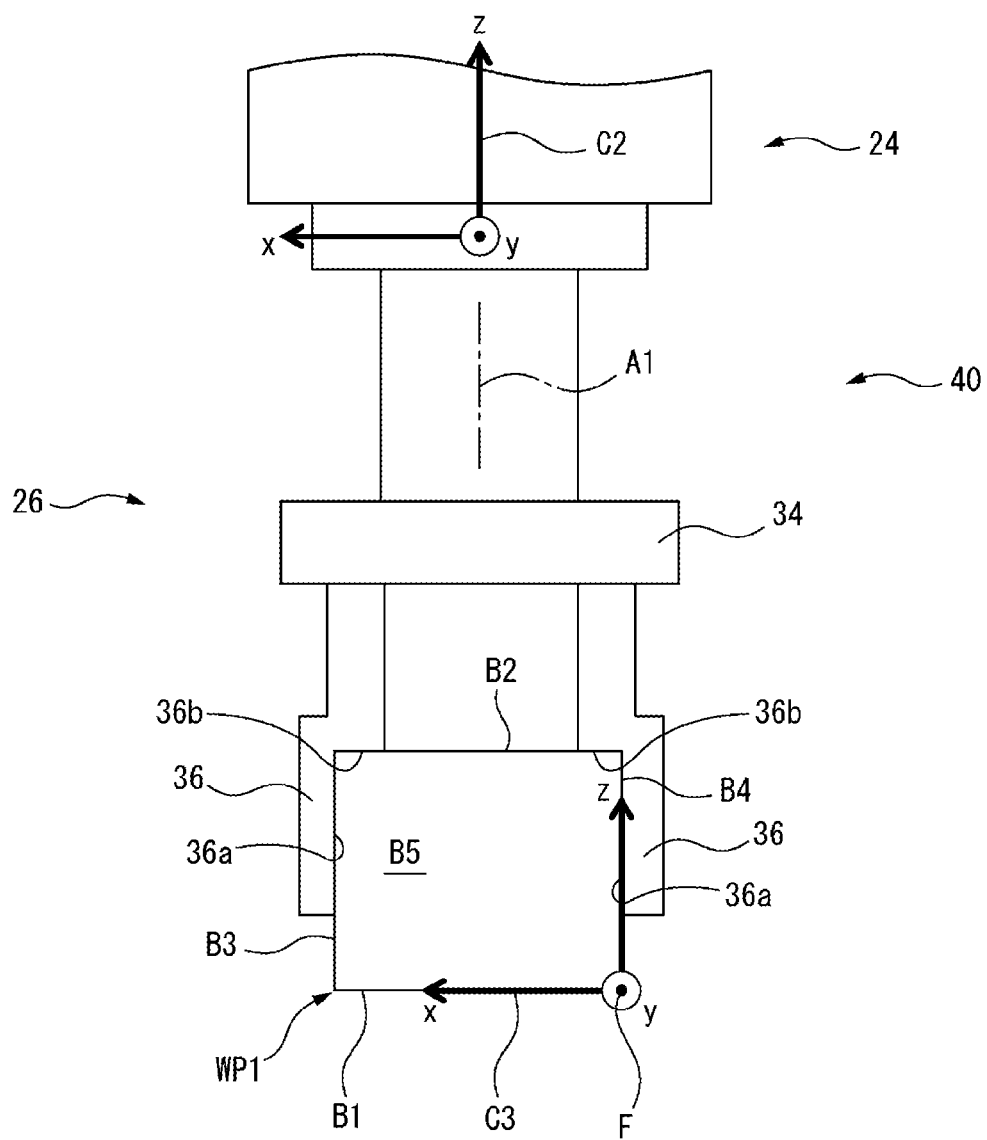
FIG. 3 is an enlarged view of a hand-tip portion of a robot illustrated in FIG. 1.

As illustrated in FIG. 3, in the present embodiment, the end effector 26 is a robot hand that can grip a workpiece WP1. Specifically, the end effector 26 includes a base 34, a plurality of claw parts 36 attached to the base 34 to be openable and closable, and a claw part driver (not illustrated) that drives the claw parts 36.

The base 34 is detachably attached to the leading end portion (what is known as a wrist flange) of the wrist 24. The claw parts 36 are provided to the base 34 to be movable in directions toward and away from each other. Each of the claw parts 36 includes, on the inner side, a gripping surface 36a and an engaging surface 36b. The gripping surface 36a is a substantially flat surface. The engaging surface 36b is a flat surface substantially orthogonal to the gripping surface 36a, and extends inward from an apical edge of the engaging surface 36b. The claw part driver is an air cylinder or a motor for example, and opens and closes the claw parts 36 in response to a command from the control device 16, and thus the end effector 26 can grip and release the workpiece WP1.

In the present embodiment, the workpiece WP1 is a substantially rectangular parallelepiped member including a bottom surface B1, a top surface B2, side surfaces B3, B4, and B5. The bottom surface B1 and the top surface B2 are flat surfaces substantially parallel to each other. The side surfaces B3 and B4 are flat surfaces that are arranged to face each other while being substantially parallel to each other, and are orthogonal to the bottom surface B1 and the top surface B2. The side surface B5 is a flat surface orthogonal to the bottom surface B1, the top surface B2, and the side surfaces B3 and B4.

The end effector 26 grips the workpiece WP1 at a predetermined gripping position. When the end effector 26 grips the workpiece WP1, the gripping surfaces 36a of the pair of claw parts 36 abut the side surfaces B3 and B4 at respective predetermined positions in the side surfaces B3 and B4 of the workpiece WP1, while the engaging surfaces 36b of the pair of claw parts 36 engage with the top surface B2 at respective predetermined positions in the top surface B2 of the workpiece WP1.

The workpiece WP1 gripped by the end effector 26 at the predetermined gripping position can be regarded as being integrated with the end effector 26, i.e., as part of the end effector 26. In the present embodiment, the leading end portion (wrist flange) of the wrist 24, the end effector 26, and the workpiece WP1 gripped by the end effector 26 at the predetermined gripping position are referred to as a hand-tip portion 40 of the robot 12.

A plurality of servomotors 38 (FIG. 2) are incorporated in respective components (the robot base 18, the swivel body 20, the lower arm 30, the upper arm 32, and the wrist 24) of the robot 12. These servomotors 38 rotate respective movable elements (the swivel body 20, the lower arm 30, the upper arm 32, and the wrist 24) of the robot 12 about a drive shaft in response to a command from the control device 16.

The working machine 14 is disposed outside the robot 12. The working machine 14 is a workpiece holding base, a worktable device, or a machine tool, for example. The workpiece holding base is fixed to the work cell. The workpiece is fixed to the workpiece holding base during work. The worktable device includes a worktable to which the workpiece is fixed, and a movement mechanism (such as a ball screw mechanism) that moves the worktable.

The machine tool is a lathe, a milling machine, a machining center that can execute a plurality of types of processes, or the like, and includes a workpiece holding mechanism (such as a jig, a worktable, or a chuck mechanism) for fixing a workpiece, a tool that processes the workpiece fixed to the workpiece holding mechanism, and a movement mechanism (such as ball screw mechanism) that causes relative movement between the workpiece holding mechanism and the tool.

Figure 4:
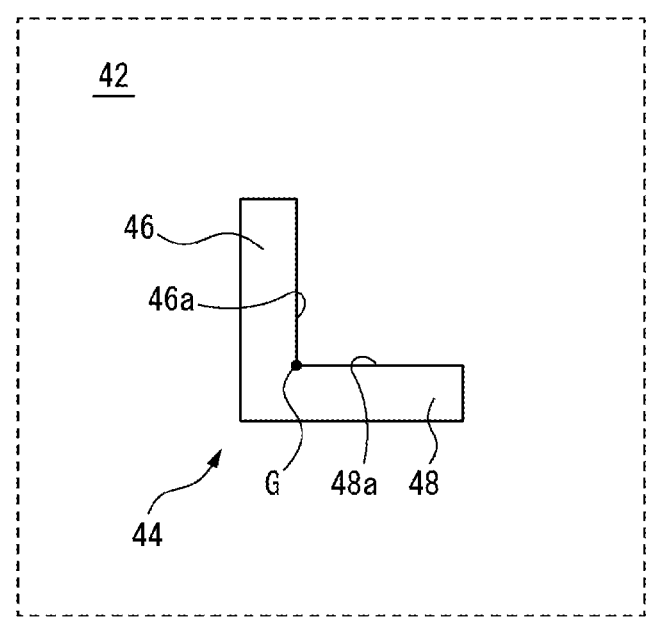
FIG. 4 is an enlarged view of a contact portion illustrated in FIG. 1.
Figure 4:
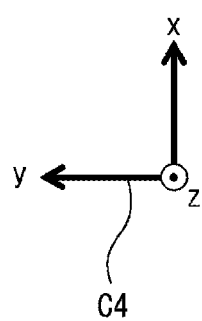

A contact portion 44 is secured to a surface 42 of the working machine 14 and protruding outward from the surface 42. As illustrated in FIG. 4, the contact portion 44 includes a first portion 46 and a second portion 48. The first portion 46 linearly extends in one direction and includes an inner surface 46a that is substantially orthogonal to the surface 42. On the other hand, the second portion 48 extends linearly from one end of the first portion 46 to be orthogonal to the first portion 46 and includes an inner surface 48a that is substantially orthogonal to the inner surface 46a of the first portion 46 and the surface 42.

Figure 2:
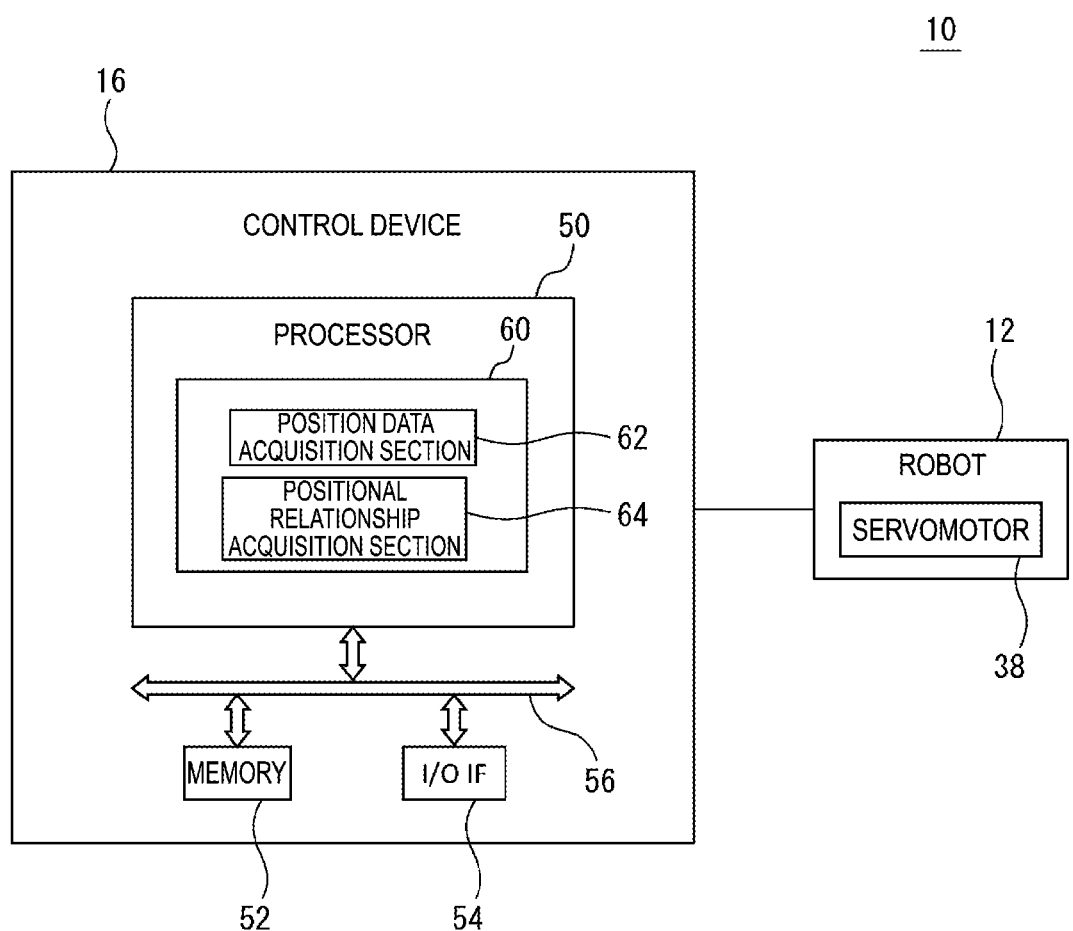
FIG. 2 is a block diagram of the system illustrated in FIG. 1.

With reference to FIG. 2, the control device 16 controls the operations of the robot 12. Specifically, the control device 16 is a computer including a processor 50, a memory 52, and an I/O interface 54. The processor 50 includes a CPU, a GPU, or the like, and is communicably connected to the memory 52 and the I/O interface 54 via a bus 56. The processor 50 performs an arithmetic processing for implementing various functions described below while communicating with the memory 52 and the I/O interface 54.

The memory 52 includes a RAM, a ROM, or the like, and stores various types of data temporarily or permanently. The I/O interface 54 includes, for example, an Ethernet (trade name) port, a USB port, a fiber optic connector, or an HDMI (trade name) terminal and performs wired or wireless data communication with an external device under a command from the processor 50. The servomotor 38 described above is communicably connected to the I/O interface 54 by wired or wireless communication manner.

A robot coordinate system C1 is set for the robot 12 as illustrated in FIG. 1. The robot coordinate system C1 is a coordinate system for automatically controlling the operation of each movable element of the robot 12, and is fixedly set relative to the robot base 18 (or the support mechanism 28). In the present embodiment, the robot coordinate system C1 is set relative to the robot 12, with its origin arranged at the center of the robot base 18 and with its z-axis matching the swivel axis of the swivel body 20.

On the other hand, as illustrated in FIG. 3, a mechanical interface (MIF) coordinate system C2 is set relative to the hand-tip portion 40. The MIF coordinate system C2 is a coordinate system defining a position and orientation of the hand-tip portion 40 (specifically, the end effector 26) in the robot coordinate system C1. In the present embodiment, the MIF coordinate system C2 is set relative to the hand-tip portion 40, with its origin arranged at the center of the leading end portion of the wrist 24 and with its z-axis matching the wrist axis A1.

When the hand-tip portion 40 (end effector 26) is moved, the processor 50 controls each of the servomotors 38 of the robot 12 to set the MIF coordinate system C2 to the robot coordinate system C1, and to arrange the hand-tip portion 40 at the position and orientation represented by the MIF coordinate system C2 thus set. Thus, the processor 50 can arrange the hand-tip portion 40 to be at an arbitrary position and in an arbitrary orientation in the robot coordinate system C1. Thus, the positional relationship (i.e., the origin position and the direction of each axis) of the MIF coordinate system C2 relative to the robot coordinate system C1 is known.

On the other hand, a user coordinate system C3 is set relative to the workpiece WP1 gripped by the end effector 26 at the predetermined gripping position. In the present embodiment, the user coordinate system C3 is set relative to the workpiece WP1, with its origin arranged at a vertex F formed by the bottom surface B1 and the side surfaces B4 and B5 of the workpiece WP1 gripped by the end effector 26, with its x-z plane being parallel to the side surface B5 of the workpiece WP1 gripped by the end effector 26, and with its y-z plane being parallel to the side surfaces B3 and B4 of the workpiece WP1 gripped by the end effector 26 (or the gripping surfaces 36a of the end effector 26).

As described above, the workpiece WP1 gripped by the end effector 26 at the predetermined gripping position can be regarded as being integrated with the end effector 26 (i.e., part of the end effector 26). Thus, when the shape and the gripping position of the workpiece WP1 are known, the positional relationship (the origin position and the direction of each axis), relative to the MIF coordinate system C2, of the user coordinate system C3 set for the workpiece WP1 gripped by the end effector 26 at the predetermined gripping position is known.

Thus, the positional relationship of the user coordinate system C3 relative to the robot coordinate system C1 is known through the MIF coordinate system C2. More specifically, the positional relationship of the user coordinate system C3 relative to the robot coordinate system C1 can be represented using coordinates D(X, Y, Z, W, P, R) of the robot coordinate system C1.

Here, the coordinates D(X, Y, Z) represents the coordinates of the origin of the user coordinate system C3 in the robot coordinate system C1. On the other hand, the coordinates D(W, P, R) represent the inclination (what is known as yaw, pitch, roll) of the x-axis, y-axis, and z-axis of the user coordinate system C3 relative to the x-axis, y-axis, and z-axis of the robot coordinate system C1. A coordinate transformation matrix M13 from the robot coordinate system C1 to the user coordinate system C3 is a known homogeneous transformation matrix. Each parameter of the coordinate transformation matrix M13 is defined by the coordinates D(X, Y, Z, W, P, R).

As illustrated in FIG. 1, a working machine coordinate system C4 is set for the working machine 14. The working machine coordinate system C4 defines the position and orientation of each component of the working machine 14. Each component of the working machine 14 is represented by coordinates in the working machine coordinate system C4. In the present embodiment, the working machine coordinate system C4 is fixedly set relative to the working machine 14, with its origin arranged at one end point on the bottom surface of the working machine 14 and with its z-axis direction being in parallel with a height direction (e.g., vertical direction) of the working machine 14.

The surface 42 and the contact portion 44 of the working machine 14 are arranged at known positions in the working machine coordinate system C4. In the present embodiment, they are arranged at known positions in the working machine coordinate system C4 with the surface 42 of the working machine 14 being parallel with the x-y plane of the working machine coordinate system C4, with the inner surface 46a of the contact portion 44 being parallel with the x-z plane of the working machine coordinate system C4, and the inner surface 48a of the contact portion 44 being parallel with the y-z plane of the working machine coordinate system C4. Thus, a vertex G formed by the surface 42, the inner surface 46a, and the inner surface 48a are represented by known coordinates in the working machine coordinate system C4.

In this context, in the present embodiment, the positional relationship between the robot coordinate system C1 (i.e., the robot 12) and the working machine coordinate system C4 (i.e., the working machine 14) is unknown. The processor 50 functions as a device 60 that acquires the positional relationship between the robot coordinate system C1 and the working machine coordinate system C4. The functions of the device 60 will be described below.

Figure 5:
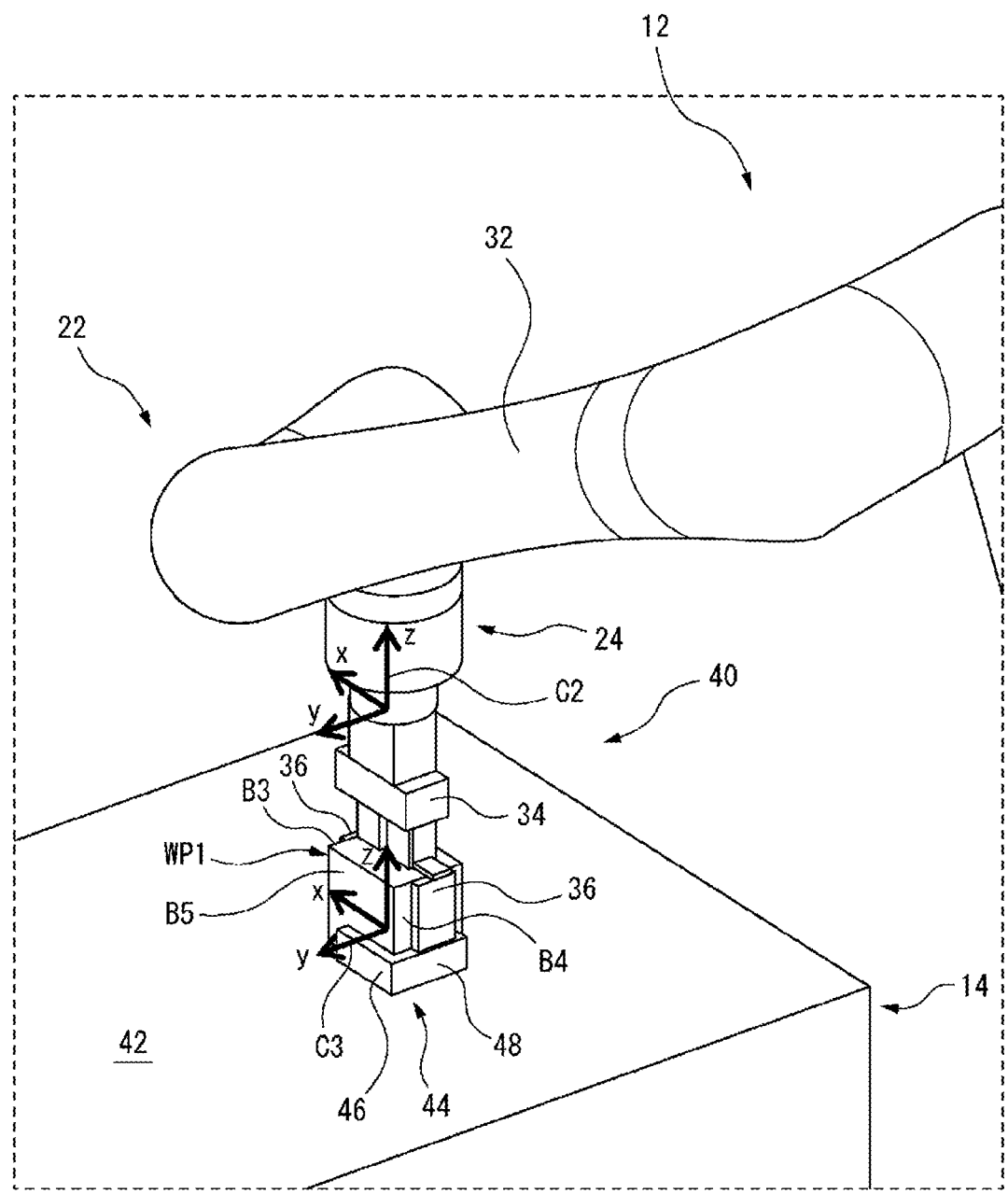
FIG. 5 is an enlarged view of a main portion of FIG. 1.
Figure 6:
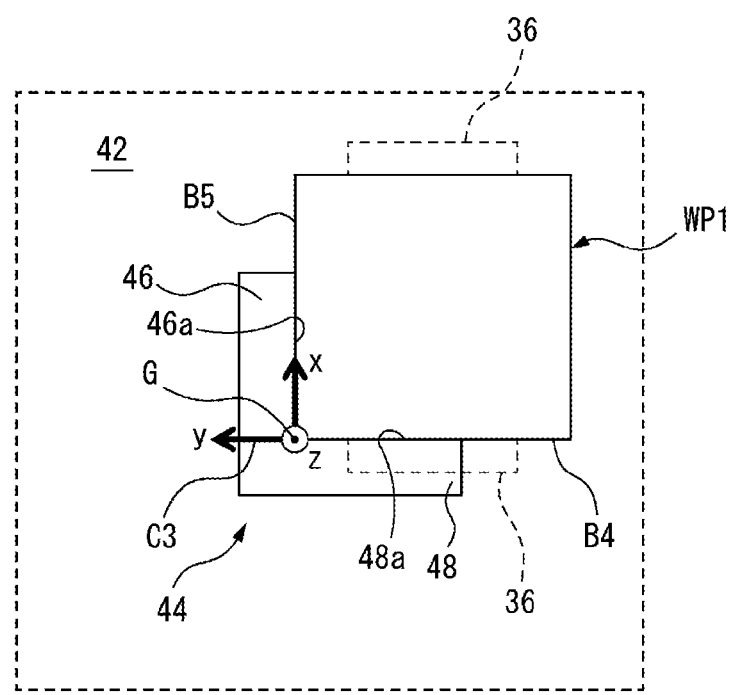
FIG. 6 illustrates a state where the hand-tip portion of the robot is in contact with the contact portion illustrated in FIG. 4.
Figure 6:
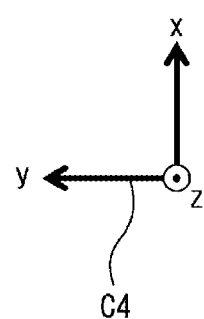

First of all, the robot 12 brings the workpiece WP1 gripped by the end effector 26 at the predetermined gripping position into contact with the contact portion 44 as illustrated in FIG. 1, FIG. 5, and FIG. 6. In this state, the bottom surface B1 of the workpiece WP1 is in surface contact with the surface 42 of the working machine 14, the side surface B5 of the workpiece WP1 is in surface contact with the inner surface 46a of the contact portion 44, and the side surface B4 of the workpiece WP1 is in surface contact with the inner surface 48a of the contact portion 44. Thus, the hand-tip portion 40 is stationarily arranged at a predetermined position $PS_1$ and orientation $OR_1$ relative to the working machine 14.

The positional relationship of the user coordinate system C3 relative to the working machine coordinate system C4 in this state is known. Specifically, it can be regarded that the origin of the user coordinate system C3 matches the position of the vertex G described above, the x-y plane of the user coordinate system C3 is parallel with the surface 42 of the working machine 14, the x-z plane of the user coordinate system C3 is parallel with the inner surface 46a of the contact portion 44, and the y-z plane of the user coordinate system C3 is parallel with the inner surface 48a of the contact portion 44.

Thus, the coordinates of the user coordinate system C3 in the working machine coordinate system C4 in this state can be represented as known coordinates $E_1(x_1, y_1, z_1, w_1, p_1, r_1)$. The coordinates $E_1(x_1, y_1, z_1)$ represent the coordinates of the origin of the user coordinate system C3 (i.e., the vertex G) in the working machine coordinate system C4. On the other hand, the coordinates $E_1(w_1, p_1, r_1)$ represent inclination (what is known as yaw, pitch, roll) relative to the x-axis, y-axis, and z-axis of the user coordinate system C3 relative to the x-axis, y-axis, and z-axis of the working machine coordinate system C4.

Further, a coordinate transformation matrix $M43_{-1}$ from the working machine coordinate system C4 to the user coordinate system C3 is a known homogeneous transformation matrix, and each parameter of the coordinate transformation matrix $M43_{-1}$ can be obtained from the coordinates $E_1(x_1, y_1, z_1, w_1, p_1, r_1)$. Thus, the positional relationship between the working machine coordinate system C4 and the user coordinate system C3 can be known.

With the hand-tip portion 40 (specifically, the workpiece WP1) thus in contact with the contact portion 44, the hand-tip portion 40 is stationarily arranged at the predetermined position $PS_1$ and in the orientation $OR_1$ relative to the working machine 14. These position $PS_1$ and orientation $OR_1$ of the hand-tip portion 40 relative to the working machine coordinate system C4 are represented by the coordinates $E_1(x_1, y_1, z_1, w_1, p_1, r_1)$ of the user coordinate system C3. Thus, the contact portion 44 functions as an element for representing the position $PS_1$ and orientation $OR_1$ of the hand-tip portion 40, in the working machine coordinate system C4.

The processor 50 acquires second position data $\beta_1$ indicating the position $PS_1$ and orientation $OR_1$ relative to the working machine coordinate system C4 when the hand-tip portion 40 is arranged at the position $PS_1$ and in the orientation $OR_1$. As an example, the processor 50 acquires, as the second position data $\beta_1$, the coordinates $E_1(x_1, y_1, z_1, w_1, p_1, r_1)$ or the coordinate transformation matrix $M43_{-1}$ described above.

As another example, the processor 50 may acquire, as the second position data $\beta_1$, a coordinate transformation matrix $M34_{-1}$ from the user coordinate system C3 to the working machine coordinate system C4 when the hand-tip portion 40 is arranged at the position $PS_1$ and in the orientation $OR_1$. This coordinate transformation matrix $M34_{-1}$ is obtained as an inverse transformation matrix: $inv(M43_{-1})$ of the coordinate transformation matrix $M43_{-1}$ described above.

As another example, the processor 50 may acquire, as the second position data $\beta_1$, coordinates $E_1'(x_1', y_1', z_1', w_1', p_1', r_1')$ of the working machine coordinate system C4 in the user coordinate system C3 when the hand-tip portion 40 is arranged at the position $PS_1$ and in the orientation $OR_1$. The coordinates $E_1'$ can be obtained from the coordinate transformation matrix $M34$ (=$inv(M43_{-1})$).

In the present embodiment as described above, the second position data $\beta_1$ includes the coordinates $E_1(x_1, y_1, z_1, w_1, p_1, r_1)$, the coordinates $E_1'(x_1', y_1', z_1', w_1', p_1', r_1')$, the coordinate transformation matrix $M43_{-1}$, and the coordinate transformation matrix $M34_{-1}$, and the processor 50 functions as a position data acquisition section 62 (FIG. 2) that acquires the second position data $\beta_1$.

On the other hand, the processor 50 acquires first position data $\alpha_1$ indicating the position $PS_1$ and orientation $OR_1$ relative to the robot coordinate system C1 when the hand-tip portion 40 is arranged at the position $PS_1$ and in the orientation $OR_1$. The coordinates of the user coordinate system C3 in the robot coordinate system C1 when the hand-tip portion 40 is arranged at the position $PS_1$ and in the orientation $OR_1$ are represented by known coordinates $D_1(X_1, Y_1, Z_1, W_1, P_1, R_1)$. Each parameter of the coordinate transformation matrix $M13_{-1}$ from the robot coordinate system C1 to the user coordinate system C3 is obtained from the coordinates $D_1(X_1, Y_1, Z_1, W_1, P_1, R_1)$.

As an example, the processor 50 acquires, as the first position data $\alpha_1$, the coordinates $D_1(X_1, Y_1, Z_1, W_1, P_1, R_1)$ or the coordinate transformation matrix $M13_{-1}$ described above. As another example, the processor 50 may acquire, as the first position data $\alpha_1$, a coordinate transformation matrix $M31$ from the user coordinate system C3 to the robot coordinate system C1 when the hand-tip portion 40 is arranged at the position $PS_1$ and in the orientation $OR_1$. This coordinate transformation matrix $M31$ is obtained as an inverse transformation matrix: $inv(M13_{-1})$ of the coordinate transformation matrix $M13_{-1}$ described above.

As another example, the processor 50 may acquire, as the first position data $\alpha_1$, coordinates $D_1'(X_1', Y_1', Z_1', W_1', P_1', R_1')$ of the robot coordinate system C1 in the user coordinate system C3 when the hand-tip portion 40 is arranged at the position $PS_1$ and in the orientation $OR_1$. The coordinates $D_1'$ can be obtained from the coordinate transformation matrix $M31_{-1}$ (=$inv(M13_{-1})$).

In the present embodiment as described above, the first position data $\alpha_1$ includes the coordinates $D_1(X_1, Y_1, Z_1, W_1, P_1, R_1)$, the coordinates $D_1'(X_1', Y_1', Z_1', W_1', P_1', R_1')$, the coordinate transformation matrix $M13_{-1}$, and the coordinate transformation matrix $M31_{-1}$, and the processor 50 functions as the position data acquisition section 62 (FIG. 2) and acquires the first position data cu.

Next, using the first position data $\alpha_1$ and the second position data $\beta_1$ acquired, the processor 50 acquires third position data $\gamma_1$ indicating the positional relationship between the robot coordinate system C1 and the working machine coordinate system C4. As an example, the processor 50 acquires, as the third position data $\gamma_1$, a coordinate transformation matrix $M14_{-1}$ from the robot coordinate system C1 to the working machine coordinate system C4. Specifically, using the coordinate transformation matrix $M13_{-1}$ as the first position data $\alpha_1$, the coordinate transformation matrix $M34$ (or $M43_{-1}$) as the second position data $\beta_1$ for calculation, the processor 50 can obtain, by an arithmetic processing, the coordinate transformation matrix $M14_{-1}$ from a formula $M14_{-1}=M13_{-1}zM34_{-1}=M13_{-1}zinv(M43_{-1})$.

As another example, the processor 50 may acquire, as the third position data $\gamma_1$, coordinates $D_2(X_2, Y_2, Z_2, W_2, P_2, R_2)$ of the working machine coordinate system C4 in the robot coordinate system C1. The coordinates $D_2(X_2, Y_2, Z_2, W_2,$ $P_2$, $R_2$) can be obtained from each parameter of the coordinate transformation matrix $M14_{-1}$, which is known.

As further another example, the processor 50 may acquire, as the third position data $\gamma_1$, a coordinate transformation matrix $M41_{-1}$ from the working machine coordinate system C4 to the robot coordinate system C1. This coordinate transformation matrix $M41_{-1}$ can be obtained as an inverse transformation matrix: $inv(M14_{-1})$ of the coordinate transformation matrix $M14_{-1}$ described above. Alternatively, the coordinate transformation matrix $M41_{-1}$ can be obtained from a formula $M41_{-1}=M43_{-1}zM31_{-1}=M43_{-1}zinv(M13_{-1})$, using the coordinate transformation matrix $M31_{-1}$ (or $M13_{-1}$) as the first position data $\alpha_1$ and the coordinate transformation matrix $M43_{-1}$ as the second position data $\beta_1$.

As yet another example, the processor 50 may acquire, as the third position data $\gamma_1$, coordinates $E_2(x_2, y_2, z_2, w_2, p_2, r_2)$ of the robot coordinate system C1 in the working machine coordinate system C4. The coordinates $E_2$ can be obtained from each parameter of the coordinate transformation matrix $M41_{-1}$ described above.

Thus, in the present embodiment, the processor 50 functions as a positional relationship acquisition section 64 (FIG. 2) that acquires the third position data $\gamma_1$ (the coordinate transformation matrix $M14_{-1}$, the coordinate transformation matrix $M41_{-1}$, the coordinates $D_2$, or the coordinates $E_2$) using the first position data $\alpha_1$ and the second position data $\beta_1$.

As described above, the processor 50 functions as the device 60 that includes the position data acquisition section 62 and the positional relationship acquisition section 64, and acquires the third position data $\gamma_1$, indicating the positional relationship between the robot coordinate system C1 and the working machine coordinate system C4, from the first position data $\alpha_1$ and the second position data $\beta_1$. With this configuration, the third position data $\gamma_1$ can be acquired by arranging the hand-tip portion 40 at one position $PS_1$ and in one orientation $OR_1$ without executing a process of touching up a plurality of points set to the working machine 14 using the hand-tip portion 40. Thus, the process of obtaining the positional relationship between the robot coordinate system C1 and the working machine coordinate system C4 can be largely simplified.

In the present embodiment, the hand-tip portion 40 comes into contact with the contact portion 44 being provided for representing the position $PS_1$ and orientation $OR_1$ of the hand-tip portion 40 in the working machine coordinate system C4, and the hand-tip portion 40 is arranged at the $PS_1$ and in the orientation $OR_1$. With this configuration, the position $PS_1$ and orientation $OR_1$ of the hand-tip portion relative to the working machine coordinate system C4 (specifically, the positional relationship of the user coordinate system C3) can be known by simply bringing the hand-tip portion 40 into contact with the contact portion 44. Thus, the second position data $\beta_1$ can be acquired easily and accurately.

In the present embodiment, the device 60 is configured to acquire the positional relationship between the robot 12 and the working machine 14 (specifically, the third position data $\gamma_1$), based on the position and orientation of the robot 12 relative to the working machine 14 (specifically, the second position data $\beta_1$) when the robot 12 (specifically, the hand-tip portion 40) comes into contact with the contact portion 44. With this configuration, by simply bringing the robot 12 into contact with the contact portion 44, the positional relationship between the robot 12 and the working machine 14 (third position data $\gamma_1$) can be acquired.

Note that the contact portion 44 is not limited to the mode illustrated in FIG. 4, and may be, for example, of any structure such as a hole, a recess, or a protrusion formed in the working machine 14 or the workpiece holding mechanism (chuck mechanism, jig) or the like that fixes the workpiece WP1, as long as the position $PS_1$ and orientation $OR_1$ of the hand-tip portion 40 (positional relationship of the user coordinate system C3) relative to the working machine coordinate system C4 can be known by bringing the hand-tip portion 40 (e.g., the workpiece WP1) into contact with the contact portion 44 and stationarily arrange the hand-tip portion 40.

Next, a system 70 according to another embodiment will be described with reference to FIG. 7 and FIG. 8. The system 70 is different from the system 10 described above in that it further includes a teaching device 72. The teaching device 72 is a computer such as what is known as a teaching pendant or a tablet terminal device, and is communicably connected to the I/O interface 54 of the control device 16 by wired or wireless communication manner.

The teaching device 72 includes a processor (not illustrated), a memory (not illustrated), a display device 74, and an input device 76. The display device 74 includes a liquid crystal display, an organic EL display, or the like and displays various types of data. The input device 76 includes a push button, a touch panel, or the like, and receives an input operation from an operator.

In the system 70, the operator operates the teaching device 72 to teach the robot 12 about an operation to arrange the hand-tip portion 40 of the robot 12 at the position $PS_1$ and in the orientation $OR_1$. Specifically, the operator operates the input device 76 while viewing data displayed on the display device 74, and thus inputs input data to the input device 76 to cause a jog operation of the hand-tip portion 40 of the robot 12 in the robot coordinate system C1.

The teaching device 72 generates a teaching command TC for causing the jog operation of the robot 12 in accordance with the input data to the input device 76, and transmits the teaching command TC to the I/O interface 54 of the control device 16. The processor 50 of the control device 16 receives the teaching command TC through the I/O interface 54.

Thus, in the present embodiment, the processor 50 functions as a teaching command receiving section 78 (FIG. 8) that receives the teaching command TC. In response to the teaching command TC received, the processor 50 generates a command to each of the servomotors 38 of the robot 12, to cause the jog operation of the hand-tip portion 40 of the robot 12.

Until the workpiece WP1 gripped by the end effector 26 at the predetermined gripping position comes into contact with the contact portion 44, the operator operates the input device 76 of the teaching device 72, and the processor 50 causes the jog operation of the hand-tip portion 40 of the robot 12 in response to the teaching command TC from the teaching device 72.

As a result, the hand-tip portion 40 (the workpiece WP1) comes into contact with the contact portion 44 to be arranged at the position $PS_1$ and in the orientation $OR_1$, with the bottom surface B1 of the workpiece WP1 being in surface contact with the surface 42 of the working machine 14, the side surface B5 of the workpiece WP1 being in surface contact with the inner surface 46a of the contact portion 44, and the side surface B4 of the workpiece WP1 being in surface contact with the inner surface 48a of the contact portion 44. In this way, the processor 50 functions as a robot control section (FIG. 8) that operates the robot 12, by bringing the hand-tip portion 40 (specifically, the workpiece WP1) into contact with the contact portion 44, to arrange the hand-tip portion 40 at the position $PS_1$ and in the orientation $OR_1$.

As described above, in the present embodiment, the device 60 includes the position data acquisition section 62, the positional relationship acquisition section 64, the teaching command receiving section 78, and the robot control section 79, and the processor 50 functions as the position data acquisition section 62, the positional relationship acquisition section 64, the teaching command receiving section 78, and the robot control section 79 of the device 60.

According to the present embodiment, the operator can arrange the hand-tip portion 40 at the position $PS_1$ and orientation $OR_1$, by operating the teaching device 72 to teach the robot 12 while checking the actual arrangement of the hand-tip portion 40 and the contact portion 44. Thus, a time required for an operation to arrange the hand-tip portion 40 at the position $PS_1$ and in the orientation $OR_1$ can be reduced.

Next, a system 80 according to still another embodiment will be described with reference to FIG. 9. The system 80 is different from the system 70 described above in that it includes a force sensor 82 instead of the teaching device 72. As an example, the force sensor 82 includes a plurality of torque sensors provided to the respective servomotors 38 of the robot 12. In this case, the force sensor 82 detects, as detection data DF, torque T acting on a drive shaft of each of the servomotors 38.

As another example, the force sensor 82 includes a six-axis force sensor provided to the robot base 18, the swivel body 20, the lower arm 30, the upper arm 32, or the wrist 24 of the robot 12 and including a plurality of strain gauges. In this case, the force sensor 82 detects force F acting on the robot 12, as the detection data DF. The force sensor 82 may be any type of force sensor, such as a force sensor of a torque detection type using a secondary encoder, or a force sensor of a capacitance type.

The processor 50 identifies the magnitude and direction of external force EF applied to the robot based on the detection data DF (i.e., the torque T or the force F) of the force sensor 82, and a portion of the robot 12 to which the external force EF is applied (the swivel body 20, the lower arm 30, the upper arm 32, the wrist 24, or the hand-tip portion 40).

Then, in response to the external force EF applied to an arbitrary portion of the robot 12, the processor 50 moves the portion of the robot 12 in the direction of the external force EF. Using this function, the operator teaches the robot 12 about an operation to bring the hand-tip portion 40 of the robot 12 into contact with the contact portion 44 and arrange the hand-tip portion 40 at the position $PS_1$ and in the orientation $OR_1$ (what is known as direct teaching).

Specifically, the operator switches a mode of operation of the robot 12 by the control device 16 to a teaching mode, and then applies the external force EFT for the teaching to an arbitrary portion (e.g., the hand-tip portion 40) of the robot 12. Then, the force sensor 82 detects the external force EFT as the detection data $DF_T$ and supplies the data to the processor 50.

Based on the detection data $DF_T$ detected by the force sensor 82 after the switching to the teaching mode, the processor 50 identifies the portion of the robot 12 (hand-tip portion 40) to which the external force EFT is applied, and identifies the magnitude and the direction of the external force EFT. Then, the processor 50 causes jog operation, in the direction of the external force EFT identified, of the portion (hand-tip portion 40) of the robot 12 identified as the portion to which the external force EFT is applied.

In this manner, the operator teaches the robot 12 an operation to bring the hand-tip portion 40 into contact with the contact portion 44 and arrange the hand-tip portion 40 at the position $PS_1$ and in the orientation $OR_1$, through the jog operation of the robot 12 according to the external force EFT applied to an arbitrary portion of the robot 12. Thus, in the present embodiment, the processor 50 causes the jog operation of the robot 12, in accordance with the detection data $DF_T$ using as the teaching command, where the detection data $DF_T$ was detected by the force sensor 82 when the external force EFT is applied.

Thus, the detection data $DF_T$ constitutes the teaching command (specifically, a direct teaching command for moving the hand-tip portion 40 in response to the external force EFT). The processor 50 functions as the teaching command receiving section 78 that receives this teaching command (detection data $DF_T$) and the robot control section 79 that operates the robot 12. Under the teaching mode, the processor 50 may change (e.g., increase in proportion to the magnitude of the external force EFT) a moving distance or moving speed of the jog operation of the portion of the robot 12 in accordance with the magnitude of the external force EFT identified from the detection data $DF_T$.

Note that the direct teaching described above includes teaching, not using the force sensor 82, performed by providing an operation command for the servomotor 38 through, for example, operation on an operation unit (such as a joystick). In this case, an operation command to the servomotor 38 constitutes the teaching command (direct teaching command). Alternatively, the operator may execute the direct teaching by applying the external force EFT to a portion (e.g., the lower arm 30, the upper arm 32, or the hand-tip portion 40) of the robot 12 that has been held in a state of receiving no torque on each shaft of the robot 12, to manually move the portion with the external force EFT.

Figure 10:
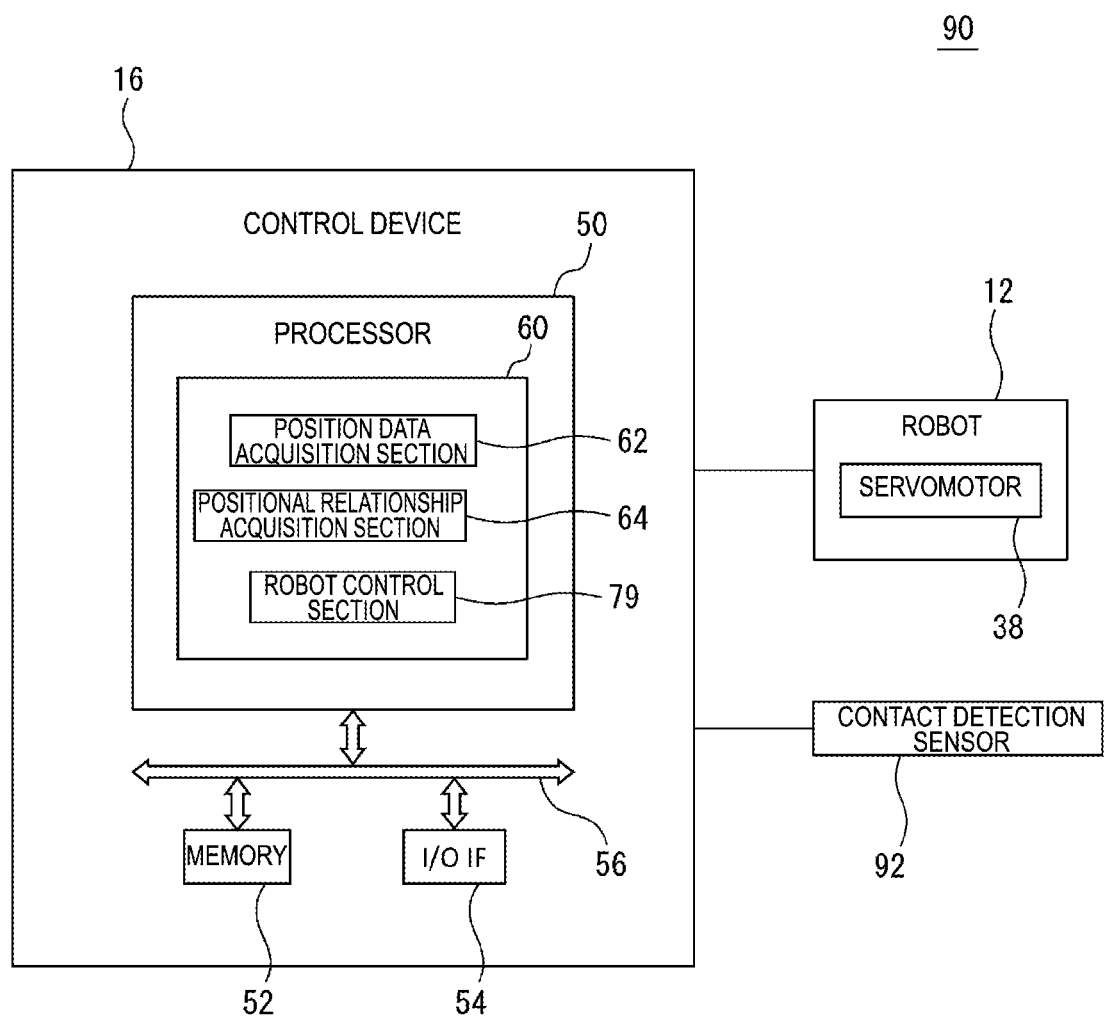
FIG. 10 is a block diagram of a system according to a yet still another embodiment.
Figure 11:
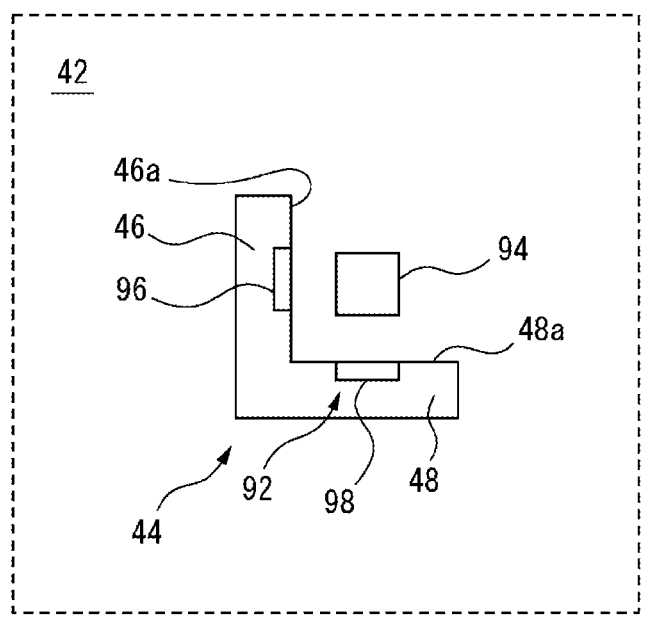
FIG. 11 illustrates a contact detection sensor according to one embodiment.
Figure 11:
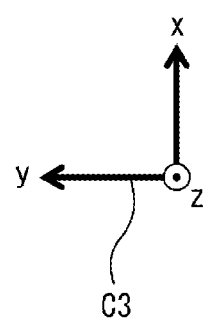

Next, a system 90 according to yet still another embodiment will be described with reference to FIG. 10 and FIG. 11. The system 90 is different from the system 10 described above in that it further includes a contact detection sensor 92. The contact detection sensor 92 detects that the hand-tip portion 40 is in contact with the contact portion 44.

Specifically, the contact detection sensor 92 includes a first sensor element 94, a second sensor element 96, and a third sensor element 98. Each of the first sensor element 94, the second sensor element 96, and the third sensor element 98, for example, is a proximity sensor (such as a capacitive proximity sensor or a proximity switch), a ranging sensor, a pressure sensor, a piezoelectric element, a strain gauge, or the like that detects approaching or contact by an object. The first sensor element 94 is provided on the surface 42 of the working machine 14. The second sensor element 96 is provided on the inner surface 46a of the contact portion 44, whereas the third sensor element 98 is provided on the inner surface 48a of the contact portion 44.

As illustrated in FIG. 6, when the hand-tip portion 40 comes into contact with the contact portion and arranged at the predetermined position $PS_1$ and orientation $OR_1$, the first sensor element 94 obtains, as detection data DA, a value $DA_0$ indicating surface contact between the bottom surface B1 of the workpiece WP1 and the surface 42, the second sensor element 96 obtains, as detection data DB, a value $DB_0$ indicating surface contact between the side surface B5 of the workpiece WP1 and the inner surface 46a of the contact portion 44, and the third sensor element 98 obtains, as detection data DC, a value $DC_0$ indicating surface contact between the side surface B4 of the workpiece WP1 and the inner surface 48a of the contact portion 44.

In other words, it can be regarded that the hand-tip portion 40 is in contact with the contact portion 44 and arranged at the position $PS_1$ and in the orientation $OR_1$, when the first sensor element detects the detection data $DA_0$, the second sensor element 96 detects the detection data $DB_0$, and the third sensor element 98 detects the detection data $DC_0$.

Next, a function of the system 90 will be described with reference to FIG. 12. A flow illustrated in FIG. 12 starts when the processor 50 receives a positional relationship acquisition command from the operator, a host controller, or a computer program. When the flow illustrated in FIG. 12 starts, the hand-tip portion 40 of the robot 12 is gripping the workpiece WP1 at the predetermined gripping position.

In step S1, the processor 50 functions as the robot control section 79 and operates the robot 12 to arrange the hand-tip portion 40 at an initial position $PS_0$ and in an initial orientation $OR_0$ determined in advance. For example, the initial position $PS_0$ may be determined by the operator as a position for arranging the workpiece WP1 in the hand-tip portion 40 to the vicinity of the contact portion 44.

The initial orientation $OR_0$ may be determined by the operator with design dimensions (CAD data) or the like of the robot 12 and the working machine 14, as an orientation with which the z-axis direction of the user coordinate system C3 is expected to be substantially orthogonal to the surface 42 of the working machine 14, the y-axis direction of the user coordinate system C3 is expected to be substantially orthogonal to the inner surface 46a of the contact portion 44, and the x-axis direction of the user coordinate system C3 is expected to be substantially orthogonal to the inner surface 48a of the contact portion 44. The initial position $PS_0$ and the initial orientation $OR_0$ may be determined by teaching the robot 12 about the operation to arrange the workpiece WP1 in the vicinity of the contact portion 44.

In step S2, the processor 50 operates the robot 12 to move the hand-tip portion 40 along a first axis. For example, the processor 50 moves the hand-tip portion 40 in the z-axis direction of the user coordinate system C3 (i.e., a direction expected to be orthogonal to the surface 42) from the initial position $PS_0$ and the initial orientation $OR_0$.

In step S3, the processor 50 determines whether the detection data DA detected by the first sensor element 94 at this point is within a tolerable range $[DA_{th1}, DA_{th2}]$ determined in advance. The operator may determine in advance thresholds $DA_{th1}$ and $DA_{th2}$ defining this tolerable range $[DA_{th1}, DA_{th2}]$, using the value $DA_0$ described above, as a reference, (e.g., to include the value $DA_0$).

The determination by the processor 50 is YES when the detection data DA is within the tolerable range (i.e., when $DA_{th1} \leq DA \leq DA_{th2}$ holds) and the processing proceeds to step S4, whereas the determination by the processor 50 is NO when the detection data DA is outside the tolerable range (i.e., when $DA < DA_{th1}$ or $DA > DA_{th2}$ holds) and the processing returns to step S2.

Thus, the processing loops between step S2 and step S3, until the processor 50 determines YES in step S3. When the determination in step S3 is YES, it can be regarded that the bottom surface B1 of the workpiece WP1 and the surface 42 are in surface contact. Each time step S2 is executed, the processor 50 may determine a direction of the movement of the hand-tip portion 40 in this step S2, from a z-axis positive direction and a z-axis negative direction of the user coordinate system C3, as a direction in which the detection data DA can approach the tolerable range.

For example, when a detection data $DA_n$ used in step S3 for the nth time becomes further smaller than the threshold $DA_{th1}$ or is further larger than the threshold $DA_{th2}$ in comparison with detection data $DA_{n-1}$ acquired in step S3 for the n−1th time, a direction of movement of the hand-tip portion 40 in step S2 to be executed for the n+1th time may be reversed from the direction of movement of the hand-tip portion 40 executed in nth step S2. With this configuration, it is possible to more quickly set the detection data DA within the tolerable range.

Note that, in step S2, the processor 50 may change the orientation of the hand-tip portion 40 in accordance with the latest detection data DA acquired. For example, the processor 50 can change the orientation of the hand-tip portion 40 by turning the hand-tip portion 40 in the direction about the x-axis, y-axis, or z-axis of the user coordinate system C3.

In this case, the processor 50 can determine as the direction in which the detection data DA can approach the tolerable range (e.g., the direction with which the bottom surface B1 of the workpiece WP1 becomes parallel with the surface 42), the movement direction of the hand-tip portion 40 from a direction about the x-axis, the y-axis, or the z-axis of the user coordinate system C3.

In step S4, the processor 50 operates the robot 12 to move the hand-tip portion 40 along a second axis. For example, the processor 50 moves the hand-tip portion 40 in the y-axis direction (i.e., a direction expected to be orthogonal to the inner surface 46a) of the user coordinate system C3, from the position and orientation at the point when YES is determined in step S3.

In step S5, the processor 50 determines whether the detection data DB detected by the second sensor element 96 at this point is within a tolerable range $[DB_{th1}, DB_{th2}]$ determined in advance. The operator may determine in advance thresholds $DB_{th1}$ and $DB_{th2}$ defining this tolerable range $[DB_{th1}, DB_{th2}]$, using the value $DB_0$ described above, as a reference, (e.g., to include the value $DB_0$).

The determination by the processor 50 is YES when the detection data DB is within the tolerable range (i.e., when $DB_{th1} \leq DB \leq DB_{th2}$ holds) and the processing proceeds to step S6, whereas the determination by the processor 50 is NO when the detection data DB is outside the tolerable range (i.e., when $DB < DB_{th1}$ or $DB > DB_{th2}$ holds) and the processing returns to step S4.

Thus, the processing loops between step S4 and step S5, until the processor 50 determines YES in step S5. When the determination in step S5 is YES, it can be regarded that the side surface B5 of the workpiece WP1 and the inner surface 46a are in surface contact. Each time step S4 is executed, the processor 50 may determine a direction of the movement of the hand-tip portion 40 in this step S4, from a y-axis positive direction and a y-axis negative direction of the user coordinate system C3, as a direction in which the detection data DB can approach the tolerable range.

Note that, in step S4, the processor 50 may change the orientation of the hand-tip portion 40 in accordance with the latest detection data DB acquired. In this case, the processor 50 can determine as the direction in which the detection data DB can approach the tolerable range (e.g., the direction with which the side surface B5 of the workpiece WP1 becomes parallel with the inner surface 46a of the contact portion 44), the movement direction of the hand-tip portion 40 from a direction about the x-axis, the y-axis, or the z-axis of the user coordinate system C3.

In step S6, the processor 50 operates the robot 12 to move the hand-tip portion 40 along a third axis. For example, the processor 50 moves the hand-tip portion 40 in the x-axis direction (i.e., a direction expected to be orthogonal to the inner surface 48a) of the user coordinate system C3, from the position and orientation at the point when YES is determined in step S5.

In step S7, the processor 50 determines whether the detection data DC detected by the third sensor element 98 at this point is within a tolerable range [$DC_{th1}$, $DC_{th2}$] determined in advance. The operator may determine in advance thresholds $DC_{th1}$ and $DC_{th2}$ defining this tolerable range [$DC_{th1}$, $DC_{th2}$], using the value $DC_0$ described above, as a reference, (e.g., to include the value $DC_0$).

The determination by the processor 50 is YES when the detection data DC is within the tolerable range (i.e., when $DC_{th1} \leq DC \leq DC_{th2}$ holds) and the processing proceeds to step S8, whereas the determination by the processor 50 is NO when the detection data DB is outside the tolerable range (i.e., when $DC < DC_{th1}$ or $DC > DC_{th2}$ holds) and the processing returns to step S6. Thus, the processing loops between step S6 and step S7, until the processor 50 determines YES in step S7.

When the determination in step S7 is YES, it can be regarded that the side surface B4 of the workpiece WP1 and the inner surface 48a of the contact portion 44 are in surface contact. Each time step S6 is executed, the processor 50 may determine a direction of the movement of the hand-tip portion 40 in this step S6, from an x-axis positive direction and an x-axis negative direction of the user coordinate system C3, as a direction in which the detection data DC can approach the tolerable range.

Note that, in step S6, the processor 50 may change the orientation of the hand-tip portion 40 in accordance with the latest detection data DC acquired. In this case, the processor 50 can determine as the direction in which the detection data DC can approach the tolerable range (e.g., the direction with which the side surface B4 of the workpiece WP1 becomes parallel with the inner surface 48a of the contact portion 44), the movement direction of the hand-tip portion 40 from a direction about the x-axis, the y-axis, or the z-axis of the user coordinate system C3.

As described above, the processor 50 executes steps S2 to S7 based on the detection data DA, DB, and DC obtained by the contact detection sensor 92, and thus can automatically perform the operation to bring the hand-tip portion 40 into contact with the contact portion 44 and arrange the hand-tip portion 40 at the position $PS_1$ and orientation $OR_1$ as illustrated in FIG. 6.

In step S8, the processor 50 functions as the position data acquisition section 62, and acquires the first position data cu and second position data $β_1$ as in the embodiment described above. Then, in step S9, the processor 50 functions as the positional relationship acquisition section 64 to acquire the third position data $γ_1$, as in the embodiment described above.

As described above, in the present embodiment, the processor 50 functions as the robot control section 79 and automatically executes the operation to bring the hand-tip portion 40 into contact with the contact portion 44 and arrange the hand-tip portion 40 at the position $PS_1$ and in the orientation $OR_1$. With this configuration, the process of acquiring the third position data $γ_1$ can be performed automatically and thus can be performed more easily and more quickly.

In addition, in the present embodiment, the system 90 includes the contact detection sensor 92 that detects that the hand-tip portion 40 is in contact with the contact portion 44. With this configuration, appropriate contact between the hand-tip portion 40 and the contact portion 44 can be detected automatically and accurately, and thus the operation to arrange the hand-tip portion 40 at the position $PS_1$ and in the orientation $OR_1$ can be automatically and accurately executed. The flow illustrated in FIG. 12 can be automated with a relatively simple algorithm.

Note that the contact detection sensor 92 may be provided to the robot 12. For example, the first sensor element 94 may be provided on the bottom surface B1 of the workpiece WP1 that forms a part of the hand-tip portion 40, the second sensor element 96 may be provided on the side surface B5 of the workpiece WP1, and the third sensor element 98 may be provided on the side surface B4 of the workpiece WP1. Also in this case, by executing steps S1 to S7 in FIG. 12, the processor 50 can appropriately bring the hand-tip portion 40 into contact with the contact portion 44 and arrange the hand-tip portion 40 at the position $PS_1$ and in the orientation $OR_1$.

Alternatively, the contact detection sensor 92 may include the force sensor 82 described above. Specifically, the processor 50 obtains, from the detection data $DF_{S2}$ detected by the force sensor 82, a magnitude $|EF_{S2}|$ of the external force $EF_{S2}$ applied from the surface 42 of the working machine 14 to the hand-tip portion 40, when step S2 in FIG. 12 is executed.

Then, in step S3, the processor 50 determines whether $|EF_{S2}|$ is within a tolerable range [$EF_{S2\_th1}$, $F_{S2\_th2}$] determined in advance. The tolerable range [$EF_{S2\_th1}$, $F_{S2\_th2}$] can be determined using the magnitude of the external force $EF_{S2}$ detected by the force sensor 82 as a reference, when the bottom surface B1 of the workpiece WP1 and the surface 42 are in appropriate surface contact.

Figure 12:
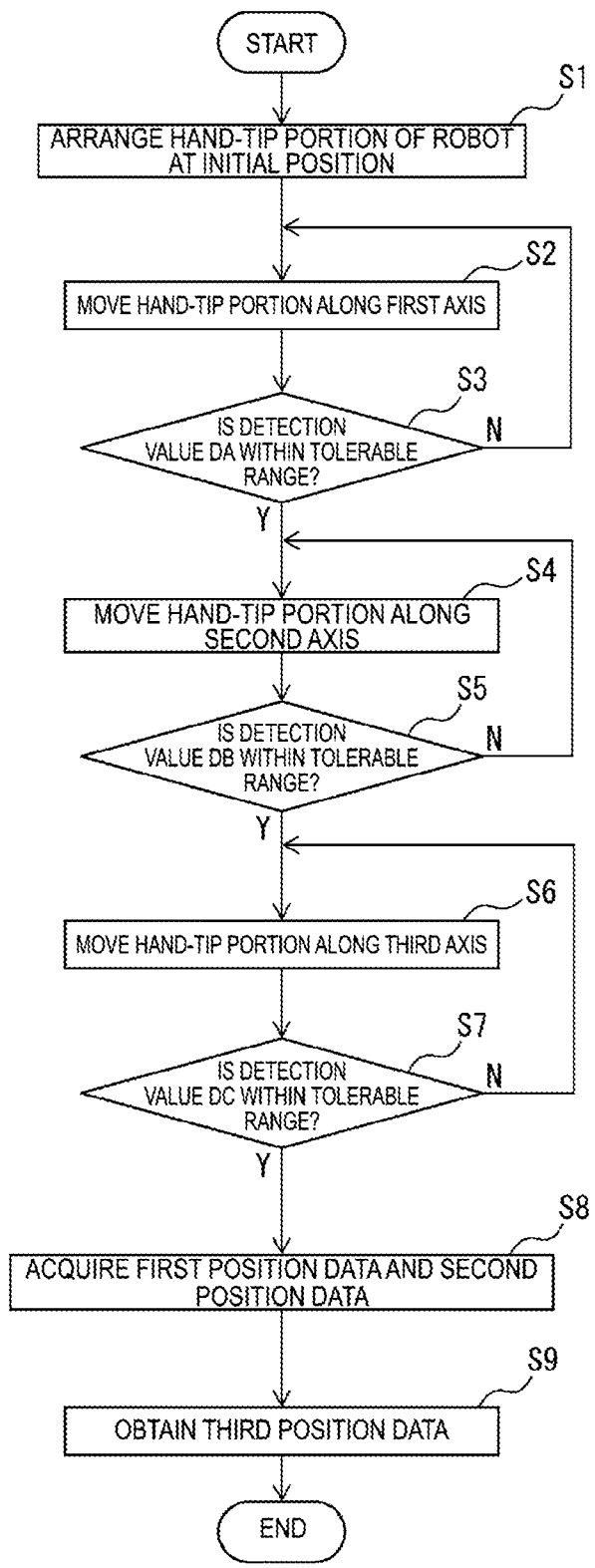
FIG. 12 is a flowchart illustrating an example of an operation flow of the system illustrated in FIG. 10.

Similarly, the processor 50 can obtain, from the detection data $DF_{S4}$ detected by the force sensor 82, a magnitude $|EF_{S4}|$ of the external force $EF_{S4}$ applied from the inner surface 46a of the contact portion 44 to the hand-tip portion 40, when step S4 in FIG. 12 is executed. Then, in step S5, the processor 50 determines whether $|EF_{S4}|$ is within a tolerable range [$EF_{S4\_th1}$, $F_{S4\_th2}$] determined in advance.

The processor 50 can obtain, from the detection data $DF_{S6}$ detected by the force sensor 82, a magnitude $|EF_{S6}|$ of the external force $EF_{S6}$ applied from the inner surface 46a of the contact portion to the hand-tip portion 40, when step S6 in FIG. 12 is executed. Then, in step S5, the processor 50 determines whether $|EF_{S6}|$ is within a tolerable range [$EF_{S6\_th1}$, $F_{S6\_th2}$] determined in advance. According to this mode, the force sensor 82 provided to the robot 12 functions as the contact detection sensor 92 that detects that the hand-tip portion 40 is in contact with the contact portion 44.

Figure 13:
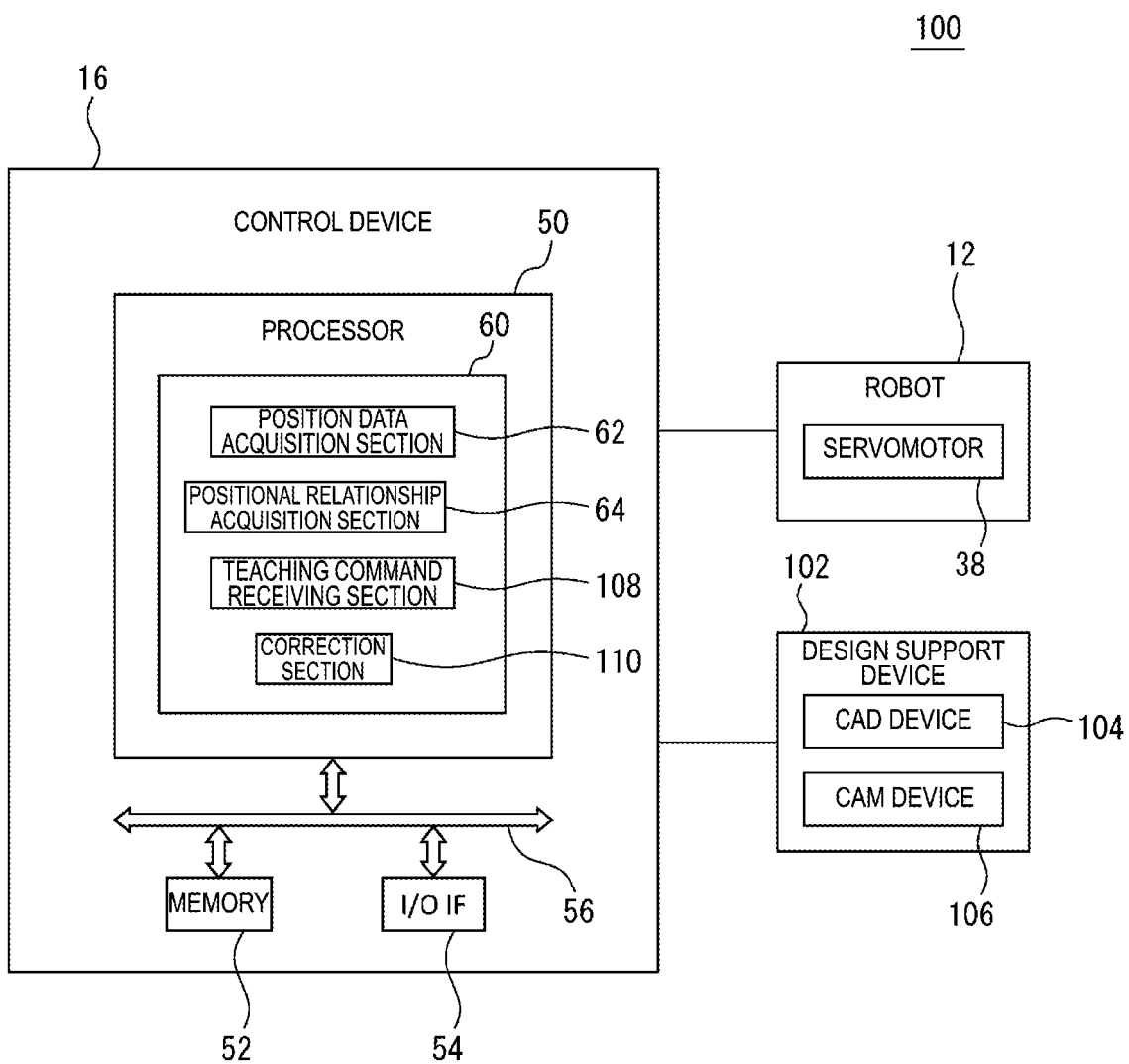
FIG. 13 is a block diagram of a system according to a yet still another embodiment.

Next, a system 100 according to yet still another embodiment will be described with reference to FIG. 13. The system 100 is different from the system 10 described above in that it further includes a design support device 102. The design support device 102 includes a CAD device 104 and a CAM device 106. In response to input from the operator, the CAD device 104 generates drawing data (three-dimensional CAD data) of a robot model 102M obtained by modeling the robot 12 illustrated in FIG. 1, and a working machine model 14M obtained by modeling the working machine 14.

Note that, in the following description, a model of a component in the real space having a member name "XX", is referred to as an "XX model". Thus, the robot model 102M includes a robot base model 18M, a swivel body model 20M, a robot arm model 22M (a lower arm model 30M, an upper arm model 32M), a wrist model 24M, and an end effector model 26M.

The CAM device 106 generates an operation program OP for the robot 12 or the working machine 14, based on the drawing data generated by the CAD device 104. Specifically, the CAM device 106 arranges the robot model 102M and the working machine model 14M in a virtual space together with the robot coordinate system C1 and the working machine coordinate system C4, in response to input from the operator. In this case, the robot model 102M and the working machine model 14M are arranged at a relative position RP1 in the design dimensions, in the virtual space.

Then, the CAM device 106 executes by simulation, in the virtual space, an operation to simulatively bring a workpiece model WM gripped by the end effector model 26M at a predetermined gripping position into contact with a contact portion model 44M provided to the working machine model 14M, and arrange a hand-tip portion model 40M at a predetermined position $PS_{1\_V}$ and orientation $OR_{1\_V}$ through the operation of the robot model 102M. Coordinates $D_{1\_V}$ ($X_{1\_V}$, $Y_{1\_V}$, $Z_{1\_V}$, $W_{1\_V}$, $P_{1\_V}$, $R_{1\_V}$) of the user coordinate system C3 in the robot coordinate system C1 when the hand-tip portion model 40M is simulatively arranged at the position $PS_{1\_V}$ and in the orientation $OR_{1\_V}$ can be known through simulation.

Through this simulation, the CAM device 106 generates an operation program OP1 for executing the operation to arrange the hand-tip portion model 40M at the position $PS_{1\_V}$ and in the orientation $OR_{1\_V}$. The operation program OP1 includes a plurality of teaching points $TP_n$ (n=1, 2, 3, . . . , $n_{MAX}$), which are passing points of the hand-tip portion model 40M (specifically, the origin of the MIF coordinate system C2) for moving the hand-tip portion model 40M to be at the position $PS_{1\_V}$ and in the orientation $OR_{1\_V}$, and a movement path between two teaching points $TP_n$ and $TP_{n+1}$.

The last teaching point $TP_{nMAX}$ among the plurality of teaching points $TP_n$ may define the position of the hand-tip portion model 40M (the origin of the MIF coordinate system C2) for positioning the hand-tip portion model 40M at the position $PS_{1\_V}$ and in the orientation $OR_{1\_V}$. The operation program OP1 generated is stored in the memory 52.

When the system 100 is constructed with the robot 12 and the working machine 14 arranged in the real space to correspond to the designed relative position RP1, there may be a difference between the designed relative position RP1 and a relative position RP2 of the robot 12 and the working machine 14 in the real space (in other words, a change from the relative position RP1 to the relative position RP2 may occur). In this case, an operation of the robot 12, in the real space, according to the operation program OP1 generated by simulation may fail to bring the hand-tip portion 40 appropriately into contact with the contact portion 44 and accurately arrange the hand-tip portion 40 at the position $PS_1$ and orientation $OR_1$.

Thus, in the present embodiment, the processor 50 acquires displacement data indicating the difference between the relative position RP1 and the relative position RP2, and corrects the operation program OP1 using the displacement data. Specifically, after constructing the system 100 in the real space, the processor 50 functions as the position data acquisition section 62 to acquire the first position data $\alpha_1$ on the relative position RP2 as in the embodiment described above. For example, the processor 50 acquires the coordinates $D_1(X_1, Y_1, Z_1, W_1, P_1, R_1)$ as the first position data $\alpha_1$.

On the other hand, the processor 50 acquires the coordinates $D_{1\_V}(X_{1\_V}, Y_{1\_V}, Z_{1\_V}, W_{1\_V}, P_{1\_V}, R_{1\_V})$ obtained with the relative position RP1 in the above simulation. Then, the processor 50 acquires a difference $\Delta_{D1}=D_1-D_{1\_V}$ between the coordinates $D_1$ and the coordinates $D_{1\_V}$ as displacement data $\Delta_{D1}$ indicating a difference between the relative position RP1 and the relative position RP2. As described above, in the present embodiment, the processor 50 functions as a displacement data acquisition section 108 that acquires the displacement data $\Delta_{D1}$ based on the first position data $\alpha_1$ (the coordinates $D_1$, $D_{1\_V}$) acquired before (i.e., with the relative position RP1) and after (i.e., with the relative position RP2) the change in the relative position RP.

Next, the processor 50 corrects the operation program OP1 using the displacement data $\Delta_{D1}$ acquired. For example, the processor 50 generates a new operation program OP2 by correcting the teaching point $TP_n$ (e.g., the last teaching point $TP_{nMAX}$) defined in the operation program OP1, using the displacement data $\Delta_{D1}$.

Thus, in the present embodiment, the processor 50 functions as a correction section 110 that corrects the operation program OP1 using the displacement data $\Delta_{D1}$. Then, the processor 50 functions as the position data acquisition section 62 to acquire the second position data $\beta_1$ and functions as the positional relationship acquisition section 64 to acquire the third position data $\gamma_1$, as in the embodiment described above.

As described above, in the present embodiment, the device 60 includes the position data acquisition section 62, the positional relationship acquisition section 64, the displacement data acquisition section 108, and the correction section 110, and the processor 50 functions as the position data acquisition section 62, the positional relationship acquisition section 64, the displacement data acquisition section 108, and the correction section 110 of the device 60.

According to the present embodiment, the operation program OP2 can be generated for causing the robot 12 to execute the operation to arrange the hand-tip portion 40 at the position $PS_1$ and in the orientation $OR_1$ in the real space, while part (e.g., the teaching point $TP_n$) of the data on the operation program OP1 generated by the simulation is corrected and the remaining part of the data on the operation program OP1 is used. Thus, the work for generating the operation program OP2 for the real space can be largely reduced.

In the system 100, the processor 50 can also acquire the displacement data using the second position data $\beta_1$. Specifically, the processor 50 acquires the coordinates $E_{1\_V}$ ($x_{1\_V}$, $y_{1\_V}$, $z_{1\_V}$, $w_{1\_V}$, $p_{1\_V}$, $r_{1\_V}$) of the user coordinate system C3 in the work coordinate system C4 when the hand-tip portion model 40M is simulatively arranged at the position $PS_{1\_V}$ and in the orientation $OR_{1\_V}$ in the above-described simulation.

After constructing the system 100 in the real space, the processor 50 functions as the position data acquisition section 62 to acquire the above-described coordinates $E_1(x_1, y_1, z_1, w_1, p_1, r_1)$ serving as the second position data $\beta_1$, as in the embodiment described above. Then, the processor 50 functions as the displacement data acquisition section 108 to acquire a difference $\Delta_{E1}=E_1-E_{1\_V}$ between the coordinates $E_1$ and the coordinates $E_{1\_V}$ as the displacement data indicating a difference between the relative position RP1 and the relative position RP2. Then, the processor 50 functions as the correction section 110 to correct the operation program OP1 using the displacement data $\Delta_{E1}$.

In the system 100, the processor 50 can also acquire the displacement data using the third position data $\gamma_1$. Specifically, the processor 50 acquires the coordinates $D_{2\_V}(X_{2\_V}, Y_{2\_V}, Z_{2\_V}, W_{2\_V}, P_{2\_V}, R_{2\_V})$ of the working machine coordinate system C4 in the robot coordinate system C1 arranged in the virtual space by the CAM device 106 for simulation.

After constructing the system 100 in the real space, the processor 50 functions as the positional relationship acquisition section 64 to acquire the above-described coordinates $D_2(X_2, Y_2, Z_2, W_2, P_2, R_2)$ serving as the third position data $\gamma_1$ as in the embodiment described above. Then, the processor 50 functions as the displacement data acquisition section 108 to acquire the difference $\Delta_{D2}=D_2-D_{2\_V}$ between the coordinates $D_2$ and the coordinates $D_{2\_V}$ as the displacement data. Then, the processor 50 functions as the correction section 110 to correct the operation program OP1 using the displacement data $\Delta_{D2}$.

Similarly, the processor 50 can acquire the displacement data $\Delta_{E2}=E_2-E_{2\_V}$ from the above-described coordinates $E_2(X_2, Y_2, Z_2, W_2, P_2, R_2)$ serving as the third position data $\gamma_1$, and the coordinates $E_{2\_V}(x_{2\_V}, y_{2\_V}, z_{2\_V}, w_{2\_V}, p_{2\_V}, r_{2\_V})$ of the robot coordinate system C1 in the working machine coordinate system C4 arranged in the virtual space, and can correct the operation program OP1 using the displacement data $\Delta_{E2}$.

Figure 14:
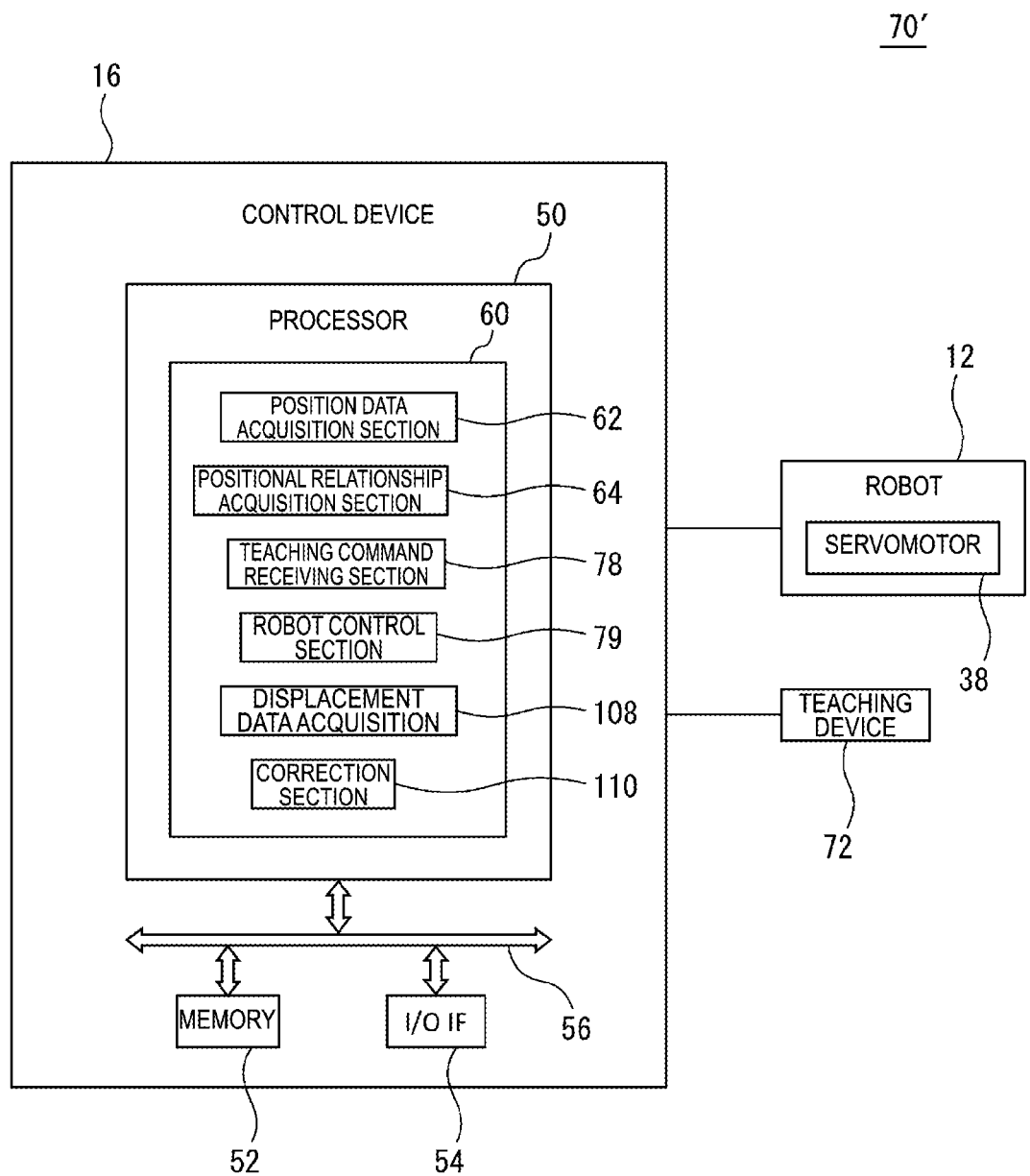
FIG. 14 is a block diagram of a system according to a yet still another embodiment.

The displacement data acquisition section 108 and the correction section 110 may be applied to the system 70 described above. Such a mode is illustrated in FIG. 7 and FIG. 14. In a system 70' illustrated in FIG. 7 and FIG. 14, the device 60 includes the position data acquisition section 62, the positional relationship acquisition section 64, the teaching command receiving section 78, the robot control section 79, the displacement data acquisition section 108, and the correction section 110.

The function of the system 70' will be described below. First of all, the operator constructs the system 70' in which the robot 12 and the working machine 14 are arranged at a relative position RP3 in the real space. With the relative position RP3, the operator operates the teaching device 72, to teach the robot 12 about the operation to bring the hand-tip portion 40 of the robot 12 into contact with the contact portion 44 and arrange the hand-tip portion 40 at a position $PS_{1\_3}$ and in an orientation $OR_{1\_3}$.

The processor 50 functions as the teaching command receiving section 78 to receive the teaching command TC from the teaching device 72, functions as the robot control section 79 to operate the robot 12 in response to the teaching command TC, and arranges the hand-tip portion 40 at the position $PS_{1\_3}$ and in the orientation $OR_{1\_3}$. Through this teaching process, the teaching device 72 (or processor 50) generates an operation program OP3 for executing an operation to arrange the hand-tip portion 40 at the position $PS_{1\_3}$ and in the orientation $OR_{1\_3}$. The operation program OP3 includes teaching points $TP_n$ (n=1, 2, 3, . . . , $n_{MAX}$) of the hand-tip portion 40 (or the origin of the MIF coordinate system C2) for moving the hand-tip portion 40 to be at the position $PS_{1\_3}$ and in the orientation $OR_{1\_3}$, and a movement path between two teaching points $TP_n$ and $TP_{n+1}$.

Next, the processor 50 functions as the position data acquisition section 62 to acquire, as first position data $\alpha_{1\_3}$, coordinates $D_{1\_3}$ ($X_{1\_3}, Y_{1\_3}, Z_{1\_3}, W_{1\_3}, P_{1\_3}, R_{1\_3}$) of the user coordinate system C3 in the robot coordinate system C1 when the hand-tip portion 40 is arranged at the position $PS_{1\_3}$ and in the orientation $OR_{1\_3}$. The processor 50 functions as the position data acquisition section 62 to acquire the second position data $\beta_{1\_3}$, and functions as the positional relationship acquisition section 64 to acquire the third position data $\gamma_{1\_3}$ indicating the positional relationship between the robot coordinate system C1 and the working machine coordinate system C4 in the relative position RP3.

Here, the system 70' may be relocated to another manufacturing line or at least one of the robot 12 and the working machine 14 may be replaced in the system 70'. In this case, in the system 70', the relative position of the robot 12 and the working machine 14 may change from the relative position RP3 before the relocation or replacement to the relative position RP4 after the relocation or the replacement. As a result, even when the robot 12 operates according to the operation program OP3 with the relative position RP4, the hand-tip portion 40 may fail to appropriately come into contact with the contact portion 44.

Thus, with the relative position RP4 after the relocation or the replacement, the operator operates the teaching device 72 again, to teach the robot 12 about the operation to bring the hand-tip portion 40 of the robot 12 into contact with the contact portion 44 and arrange the hand-tip portion 40 at a position $PS_{1\_4}$ and in an orientation $OR_{1\_4}$. Next, the processor 50 functions as the position data acquisition section 62 to acquire, as first position data $\alpha_{1\_4}$, coordinates $D_{1\_4}$ ($X_{1\_4}, Y_{1\_4}, Z_{1\_4}, W_{1\_4}, P_{1\_4}, R_{1\_4}$) of the user coordinate system C3 in the robot coordinate system C1 when the hand-tip portion 40 is arranged at the position $PS_{1\_4}$ and in the orientation $OR_{1\_4}$.

Next, the processor 50 functions as the displacement data acquisition section 108 to acquire a difference $\Delta_{D1}=D_{1\_4}-D_{1\_3}$ between the coordinates $D_{1\_3}$ acquired with the relative position RP3 and the coordinates $D_{1\_4}$ acquired with the relative position RP4 as displacement data $\Delta_{D1}$ indicating a difference between the relative position RP3 and the relative position RP4. Then, the processor 50 functions as the correction section 110 to correct the operation program OP3 using the displacement data $\Delta_{D1}$ acquired. For example, the processor 50 generates a new operation program OP4 by correcting the teaching point $TP_n$ (e.g., the last teaching point $TP_{nMAX}$) defined in the operation program OP3, using the displacement data $\Delta_{D1}$.

According to the present embodiment, the operation program OP4 can be generated for operating the robot 12 with the relative position RP4, while part (e.g., the teaching point $TP_n$) of the data on the operation program OP3 generated with the relative position RP3 is corrected and the remaining part of the data on the operation program OP3 is used. Thus, the work for generating the operation program OP4 can be largely reduced.

It should be understood that, in the system 70', the processor 50 can acquire, not only the displacement data $\Delta_{D1}$, the displacement data $\Delta_{E1}$ based on the second position data $\beta_1$ or acquire the displacement data $\Delta_{D2}$ or $\Delta_{E2}$ based on the third position data $\gamma_1$ using the method described with reference to the above-described system 100, and correct the operation program OP3 using the displacement data $\Delta_{E1}$, $\Delta_{D2}$, or $\Delta_{E2}$.

Furthermore, in the system 70', the force sensor 82 of the system 80 described above may be used instead of the teaching device 72, and using the same method as the system 80, the operator may operate the robot 12 according to the external force EFT applied to the robot 12, thereby teaching the robot 12 about the operation to bring the hand-tip portion 40 into contact with the contact portion 44 for the arranging.

Figure 15:
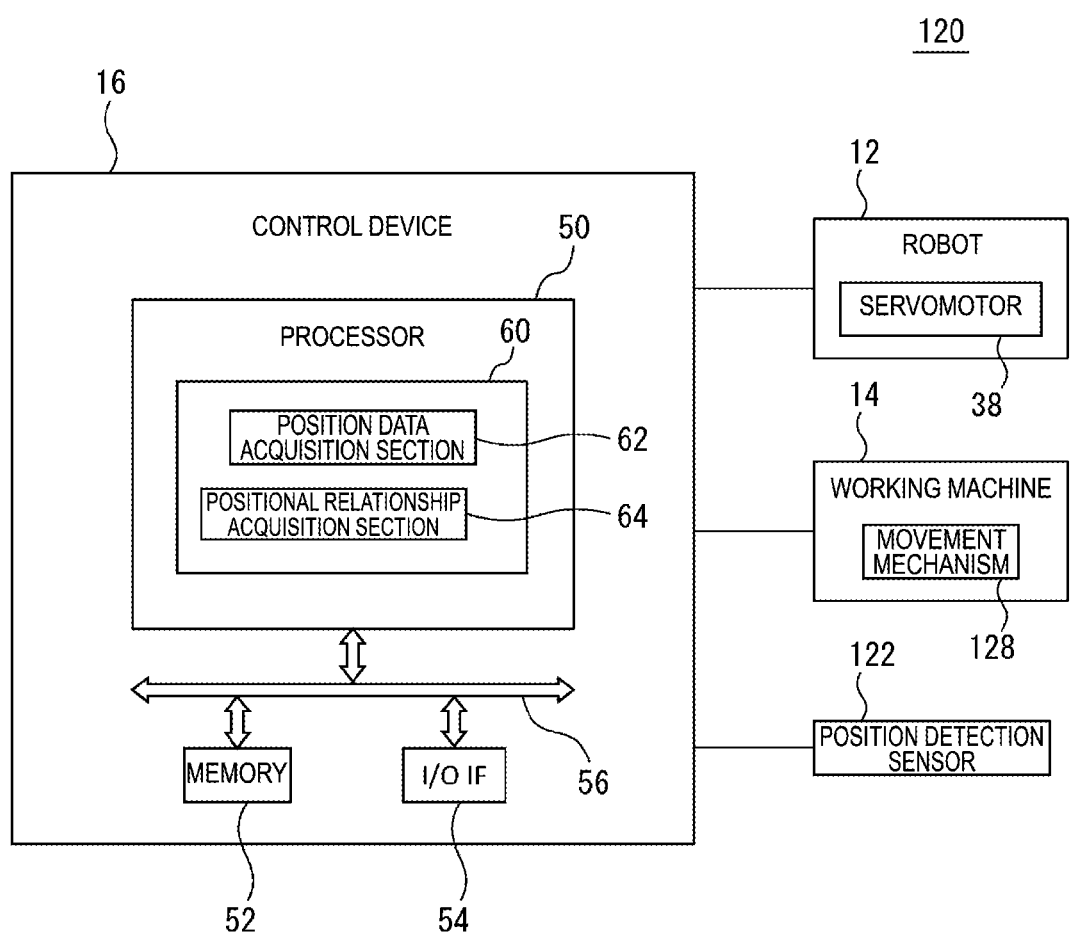
FIG. 15 is a block diagram of a system according to a yet still another embodiment.
Figure 16:
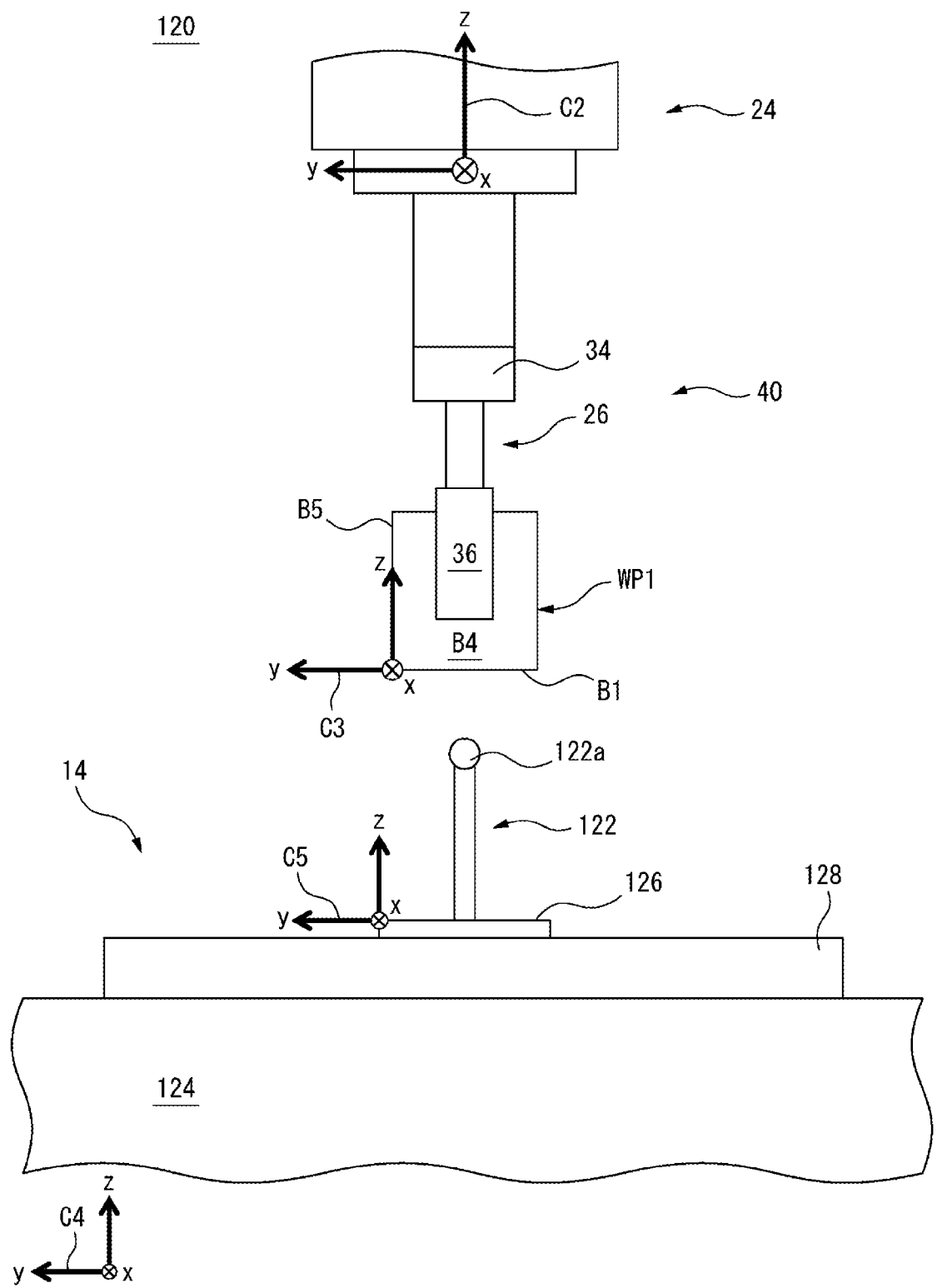
FIG. 16 illustrates a position detection sensor according to one embodiment.

Next, a system 120 according to yet still another embodiment will be described with reference to FIG. 15 and FIG. 16. The system 120 is different from the system 10 described above in the following configuration. Specifically, the system 120 further includes a position detection sensor 122. The position detection sensor 122 detects the position of the hand-tip portion 40 in the working machine coordinate system C4, when the hand-tip portion 40 is arranged at a predetermined position $PS_2$ and orientation $OR_2$. In the present embodiment, the position detection sensor 122 includes a touch probe that detects an object with a detection point 122a, which is provided at the leading end of the touch probe, in contact with the object.

On the other hand, the working machine 14 includes a main body 124 (FIG. 16), a movable portion 126, and a movement mechanism 128. The movable portion 126 is, for example, a worktable, a workpiece holding mechanism (a chuck mechanism or the like), or a spindle axis of a machine tool, and is movably provided in the main body 124. The position detection sensor 122 described above is secured to the movable portion 126 to extend linearly in one direction from the movable portion 126.

The movement mechanism 128 includes, for example, a ball screw mechanism and a servomotor that drives the ball screw mechanism (both not illustrated), and moves the movable portion 126 in the x-axis, the y-axis, and the z-axis directions of the working machine coordinate system C4 under a command from the control device 16. A movement coordinate system C5 is set for the movable portion 126 (or the position detection sensor 122). The movement coordinate system C5 is for controlling the position of the movable portion 126 in the working machine coordinate system C4, and moves together with the movable portion 126 in the working machine coordinate system C4.

Specifically, when moving the movable portion 126, the processor 50 sets the movement coordinate system C5 in the working machine coordinate system C4, and generates a command to the movement mechanism 128 to arrange the movable portion 126 at a position defined by the movement coordinate system C5 thus set. Thus, the processor 50 can arrange the movable portion 126 to be at an arbitrary position in the working machine coordinate system C4. Thus, the positional relationship (i.e., the origin position and the direction of each axis) of the movement coordinate system C5 relative to the working machine coordinate system C4 is known.

On the other hand, a detection point 122*a* of the position detection sensor 122 is arranged at a known position in the movement coordinate system C5. Thus, the position (specifically, coordinates) of the detection point 122*a* of the position detection sensor 122 in the working machine coordinate system C4 is known through the movement coordinate system C5.

The function of the system 120 will be described below. First of all, the processor 50 operates the robot 12 to arrange the hand-tip portion 40 at a predetermined position $PS_2$ and orientation $OR_2$. The position $PS_2$ is determined in advance by the operator such that, when the hand-tip portion 40 is arranged at the position $PS_2$, at least part of the hand-tip portion 40 (e.g., the workpiece WP1 gripped by the end effector 26) is included in a range of movement of the detection point 122*a* by the movement mechanism 128.

Next, the processor 50 operates the movement mechanism 128 to move the position detection sensor 122 to make the detection point 122*a* of the position detection sensor 122 touch up (contact) a plurality of positions of the hand-tip portion 40. Specifically, the processor 50 operates the movement mechanism 128 to sequentially touch up, using the detection point 122*a*, three points PT1, PT2, and PT3 on the side surface B4 of the workpiece WP1 gripped by the end effector 26. The three points PT1, PT2, and PT3 are points distributedly arranged on the side surface B4 without being aligned on a straight line.

When the detection point 122*a* touches up each of the points PT1, PT2, and PT3, the position detection sensor 122 transmits respective detection data DP1, DP2, and DP3 to the processor 50. The processor 50 acquires respective positions (coordinates) H1, H2, and H3 of the detection point 122*a* in the working machine coordinate system C4, at the time when the respective detection data DP1, DP2, and DP3 are received. From these positions H1, H2, and H3, the processor 50 can identify the position of the side surface B4 in the working machine coordinate system C4.

Next, the processor 50 operates the movement mechanism 128 to move the position detection sensor 122 and make the detection point 122*a* of the position detection sensor 122 sequentially touch up two points PT4 and PT5 on the side surface B5 of the workpiece WP1 orthogonal to the side surface B4 the three points on which have been touched up. When the detection point 122*a* touches up each of the points PT4 and PT5, the position detection sensor 122 transmits respective detection data DP4 and DP5 to the processor 50.

The processor 50 acquires respective positions (coordinates) H4 and H5 of the detection point 122*a* in the working machine coordinate system C4, at the time when the respective detection data DP4 and DP5 are received. From these positions H4 and H3, the processor 50 can identify the position of the side surface B5 in the working machine coordinate system C4.

Next, the processor 50 operates the movement mechanism 128 to move the position detection sensor 122 and make the detection point 122*a* touch up one point PT6 on the bottom surface B1 of the workpiece WP1 orthogonal to the side surface B4 the three points on which have been touched up and to the side surface B5 the two points on which have been touched up. When the detection point 122*a* touches up the point PT6, the position detection sensor 122 transmits detection data DP6 to the processor 50. The processor 50 acquires a position (coordinates) H6 of the detection point 122*a* in the working machine coordinate system C4, at the time when the detection data DP6 is received. From this position H6, the processor 50 can identify the position of the bottom surface B1 in the working machine coordinate system C4.

In this manner, the processor 50 can identify the positions of the side surfaces B4 and B5 and the bottom surface B1 in the working machine coordinate system C4 based on the detection data DP1 to DP6, and thus can identify the position and orientation (i.e., the origin position and the direction of each axis of the user coordinate system C3) of the workpiece WP1 (hand-tip portion 40) in the working machine coordinate system C4.

The coordinates of the user coordinate system C3 in the working machine coordinate system C4 in this state can be represented as known coordinates $E_3(x_3, y_3, z_3, w_3, p_3, r_3)$. Further, the coordinate transformation matrix $M43_{-2}$ from the working machine coordinate system C4 to the user coordinate system C3 is a known homogeneous transformation matrix, and each parameter of the coordinate transformation matrix $M43_{-2}$ can be obtained from the coordinates $E_3(x_3, y_3, z_3, w_3, p_3, r_3)$. Thus, the positional relationship between the working machine coordinate system C4 and the user coordinate system C3 is known.

Then, the processor 50 functions as the position data acquisition section 62 to acquire the second position data $\beta_2$ indicating the position $PS_2$ and orientation $OR_2$ in the working machine coordinate system C4 when the hand-tip portion 40 is arranged at the position $PS_2$ and in the orientation $OR_2$. For example, the processor 50 acquires the coordinate transformation matrix $M43_{-2}$ described above as the second position data $\beta_2$.

On the other hand, the processor 50 acquires first position data $\alpha_2$ indicating the position $PS_2$ and orientation $OR_2$ in the robot coordinate system C1 when the hand-tip portion 40 is arranged at the position $PS_2$ and in the orientation $OR_2$. The coordinates of the user coordinate system C3 in the robot coordinate system C1 when the hand-tip portion 40 is arranged at the position $PS_2$ and in the orientation $OR_2$ are represented by known coordinates $D_3(X_3, Y_3, Z_3, W_3, P_3, R_3)$. Each parameter of a coordinate transformation matrix $M13_{-2}$ from the robot coordinate system C1 to the user coordinate system C3 is obtained from the coordinates $D_3(X_3, Y_3, Z_3, W_3, P_3, R_3)$. For example, the processor 50 acquires the coordinate transformation matrix $M13_{-2}$ as the first position data $\alpha_2$.

Next, using the first position data $\alpha_2$ and the second position data $\beta_2$ acquired, the processor 50 acquires third position data $\gamma_2$ indicating the positional relationship between the robot coordinate system C1 and the working machine coordinate system C4. For example, the processor 50 acquires, as the third position data $\gamma_2$, a coordinate transformation matrix $M14_{-2}$ from the robot coordinate system C1 to the working machine coordinate system C4. Specifically, using the coordinate transformation matrix $M13_{-2}$ as the first position data $\alpha_2$, the coordinate transformation matrix $M43_{-2}$ as the second position data $\beta_2$ for calculation, the processor 50 can obtain, by an arithmetic processing, the coordinate transformation matrix $M14_{-2}$ from a formula $M14_{-2}=M13_{-2} \mathrm{zinv}(M43_{-2})$.

As described above, in the present embodiment, the processor 50 acquires the second position data $\beta_2$, based on the detection data DP1 to DP6 of the position detection sensor 122 that detects the position of the hand-tip portion 40 (specifically, the workpiece WP1) in the working machine coordinate system C. With this configuration, the position and orientation of the hand-tip portion 40 (i.e., the positional relationship of the user coordinate system C3) relative to the working machine coordinate system C4 can be known without using the contact portion 44 described above.

In the present embodiment, the position detection sensor 122 includes a touch probe, and is moved by the movement mechanism 128 so as to come into contact the hand-tip portion 40 (workpiece WP1) arranged at the predetermined position $PS_2$ and orientation $OR_2$, to detect the position of the hand-tip portion 40 in the working machine coordinate system C4.

With this configuration, in a case where the working machine 14 includes the movement mechanism 128 with high arranging accuracy, the position of the hand-tip portion 40 can be detected with high accuracy by the position detection sensor 122, whereby the accuracy of the second position data $\beta_2$ can be increased. Furthermore, the process of acquiring the second position data $\beta_2$ can be automated.

In the present embodiment, a case is described where the processor 50 makes the position detection sensor 122 touch up the side surface B4, the side surface B5, and the bottom surface B1 of the workpiece W. However, this should not be construed in a limiting sense, and the processor 50 may make the position detection sensor 122 touch up any of the surfaces (e.g., three surfaces of the claw parts 36 orthogonal to each other) of the hand-tip portion 40.

The position detection sensor 122 may include a vision sensor (a three-dimensional vision sensor, or a two-dimensional camera) that captures image data of the hand-tip portion 40 (workpiece WP1) in place of (or in addition to) the touch probe described above. When the position and orientation of the vision sensor in the working machine coordinate system C4 are known, the processor 50 can identify the position and orientation of the hand-tip portion 40 (workpiece WP1) in the working machine coordinate system C4 (i.e., the origin position and the direction of each axis of the user coordinate system C3) based on the image data (detection data) captured by the vision sensor.

In the system 120, as in the system 10 described above, the processor 50 may acquire, as the first position data $\alpha_2$, the above-described coordinates $D_3(X_3, Y_3, Z_3, W_3, P_3, R_3)$, the coordinate transformation matrix $M31_{-2}$ from the user coordinate system C3 to the robot coordinate system C1 when the hand-tip portion 40 is arranged at the position $PS_2$ and in the orientation $OR_2$, or coordinates $D_3'(X_3', Y_3', Z_3', W_3', P_3', R_3')$ of the robot coordinate system C1 in the user coordinate system C3.

As in the system 10 described above, the processor 50 may acquire, as the second position data $\beta_2$, the above-described coordinates $E_3(x_3, y_3, z_3, w_3, p_3, r_3)$, the coordinate transformation matrix $M34_{-2}$ from the user coordinate system C3 to the working machine coordinate system C4 when the hand-tip portion 40 is arranged at the position $PS_2$ and in the orientation $OR_2$, or coordinates $E_3'(x_3', y_3', z_3', w_3', p_3', r_3')$ of the working machine coordinate system C4 in the user coordinate system C3.

As in the system 10 described above, the processor 50 may acquire, as the third position data $\gamma_2$, coordinates $D_4(X_4, Y_4, Z_4, W_4, P_4, R_4)$ of the working machine coordinate system C4 in the robot coordinate system C1, a coordinate transformation matrix $M41_{-2}$ from the working machine coordinate system C4 to the robot coordinate system C1, or coordinates $E_4(x_4, y_4, z_4, w_4, p_4, r_4)$ of the robot coordinate system C1 in the working machine coordinate system C4.

Figure 7:
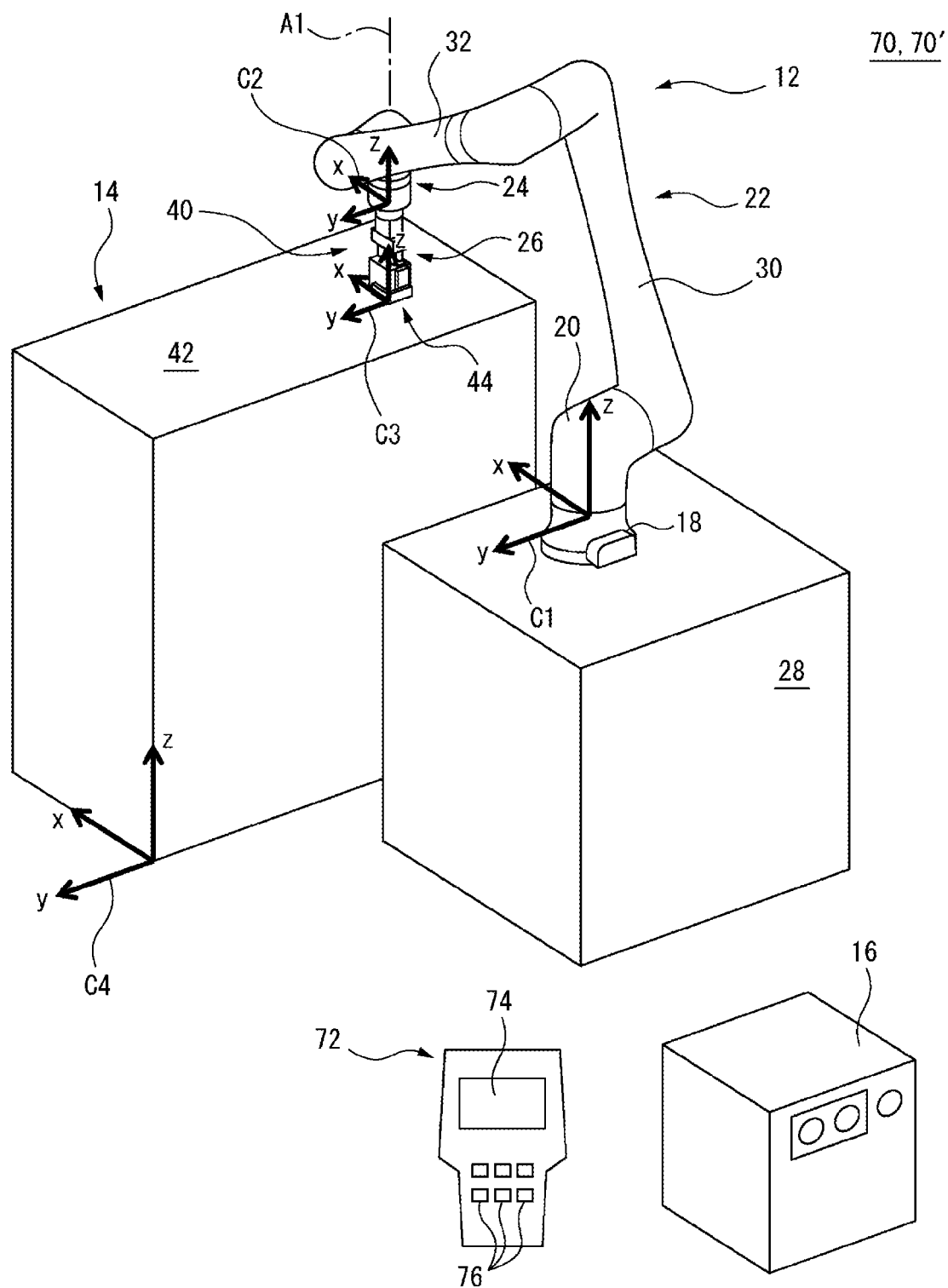
FIG. 7 is a perspective view of a system according to another embodiment.
Figure 8:
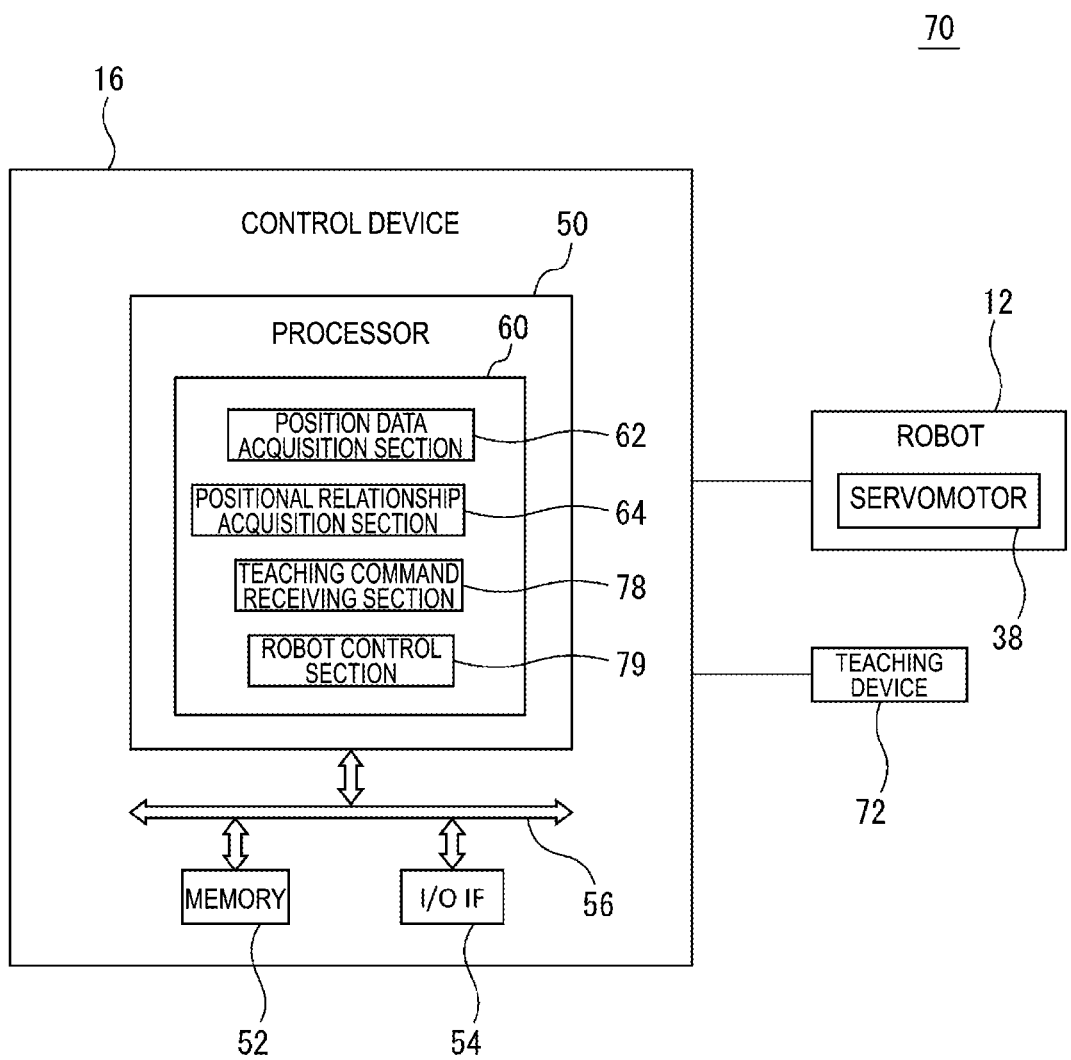
FIG. 8 is a block diagram of the system illustrated in FIG. 7.
Figure 9:
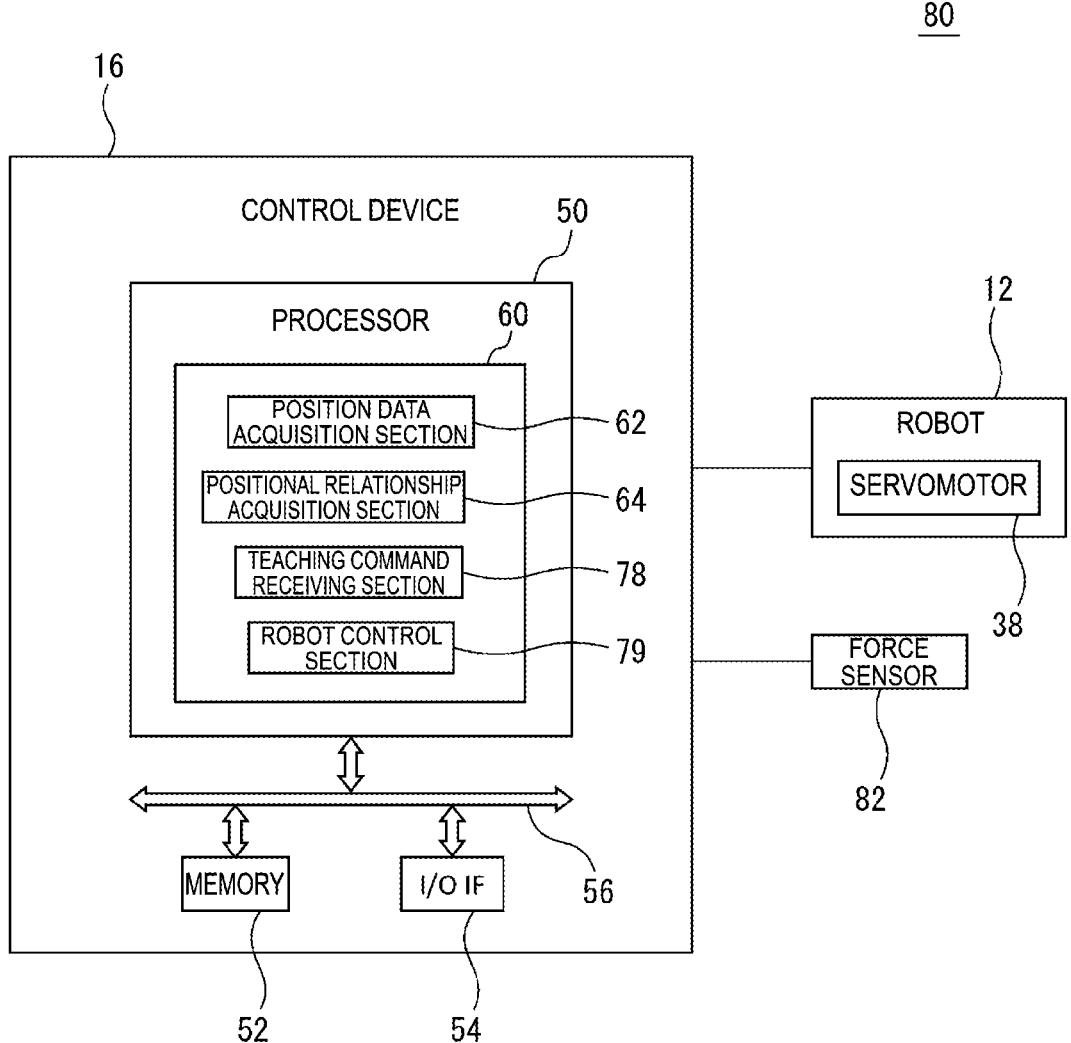
FIG. 9 is a block diagram of a system according to a still another embodiment.

The teaching device 72 illustrated in FIG. 7 or the force sensor 82 illustrated in FIG. 9 may be applied to the system 120, and the operator may teach the robot 12 about the operation to arrange the hand-tip portion 40 at the predetermined position $PS_2$ and orientation $OR_2$. In this case, the processor of the system 120 functions as the teaching command receiving section 78 described above, and functions as the robot control section 79 that operates the robot 12 to arrange the hand-tip portion 40 at the position $PS_2$ and in the orientation $OR_2$.

Next, a system 130 according to yet still another embodiment will be described with reference to FIG. 17 to FIG. 22. The system 130 includes a robot 132, a working machine 134, and the control device 16. The control device 16 controls the operations of the robot 132 and the working machine 134. As in the embodiments described above, the robot coordinate system C1 and the working machine coordinate system C4 are respectively set for the robot 132 and the working machine 134.

The robot 132 is different from the robot 12 described above in an end effector 136. The end effector 136 is a robot hand capable of gripping a workpiece WP2, and is detachably attached to the leading end portion (wrist flange) of the wrist 24. As an example, the end effector 136 includes a plurality of claw parts that can be opened and closed and a claw part driver that drives the claw parts (both not illustrated). As another example, the end effector 136 may include an adsorption portion (a negative pressure generating device, an electromagnet, a suction cup, or the like) that can adsorb the workpiece WP2, and the end effector 136 may adsorb and grip the workpiece WP2.

Figure 20:
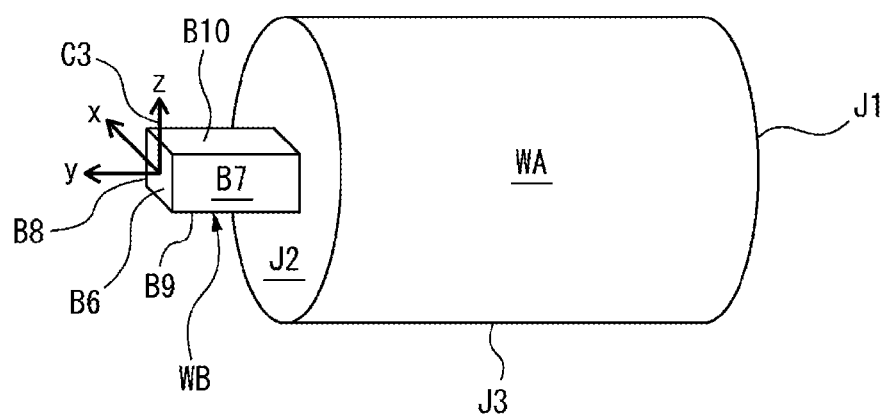
FIG. 20 is an enlarged perspective view of a workpiece illustrated in FIG. 17.

As illustrated in FIG. 20, in the present embodiment, the workpiece WP2 has a column-shaped (or cylindrical) main body WA and a quadrangular prism shaped protrusion WB protruding from the main body WA. More specifically, the main body WA includes a pair of end surfaces J1 and J2 that are each a substantially flat surface, and a cylindrical outer circumferential surface J3 extending between the end surfaces J1 and J2.

The protrusion WB is formed on the end surface J2 of the main body WA. More specifically, the protrusion WB includes a bottom surface B6 and side surfaces B7, B8, B9, and B10 that are each a substantially flat surface. The side surfaces B7 and B8 are arranged to face each other while being parallel to each other, and to be orthogonal to the bottom surface B6. The side surfaces B9 and B10 are arranged to face each other while being parallel to each other, and to be orthogonal to the bottom surface B6 and the side surfaces B7 and B8.

Figure 17:
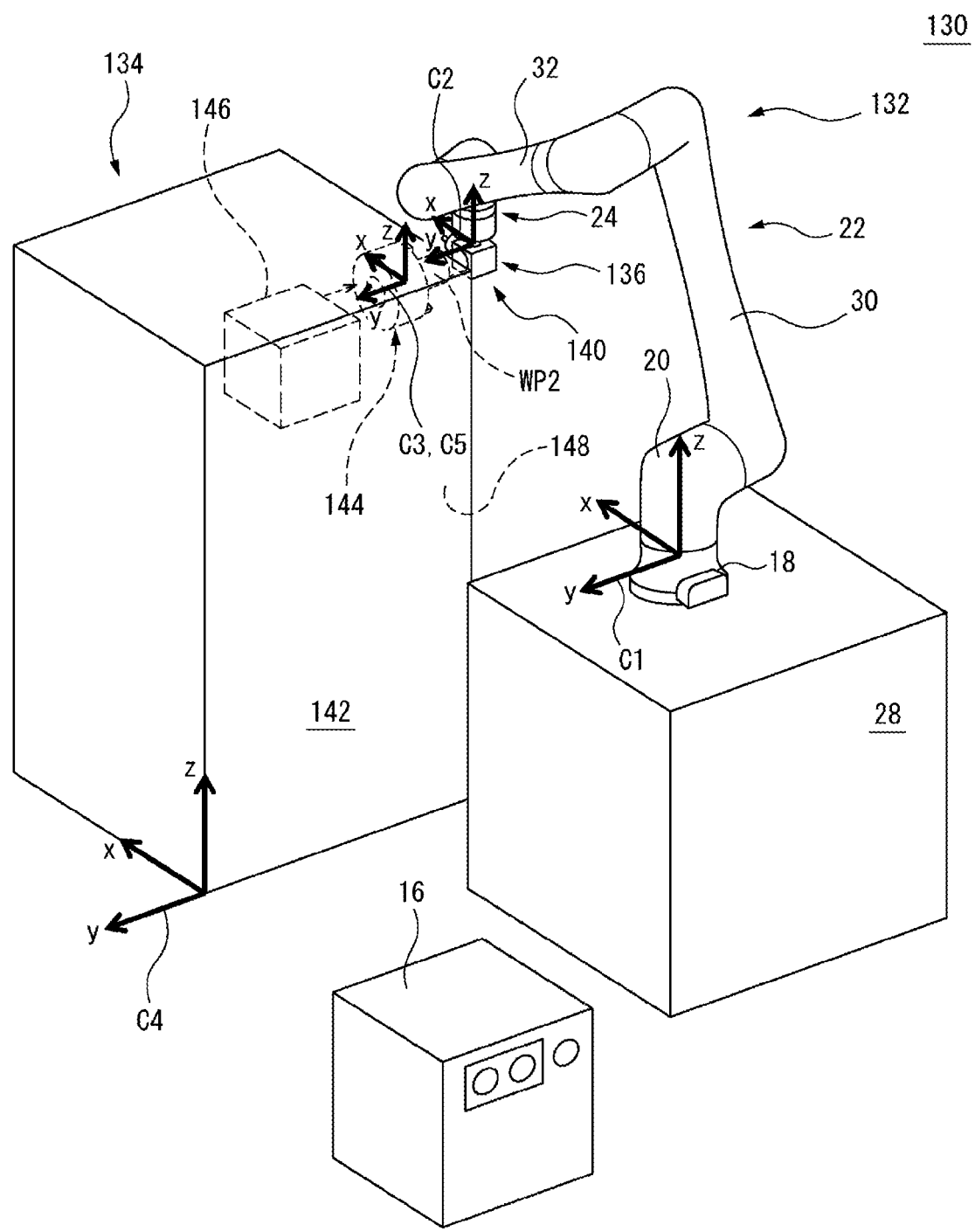
FIG. 17 is a perspective view of a system according to a yet still another embodiment.
Figure 18:
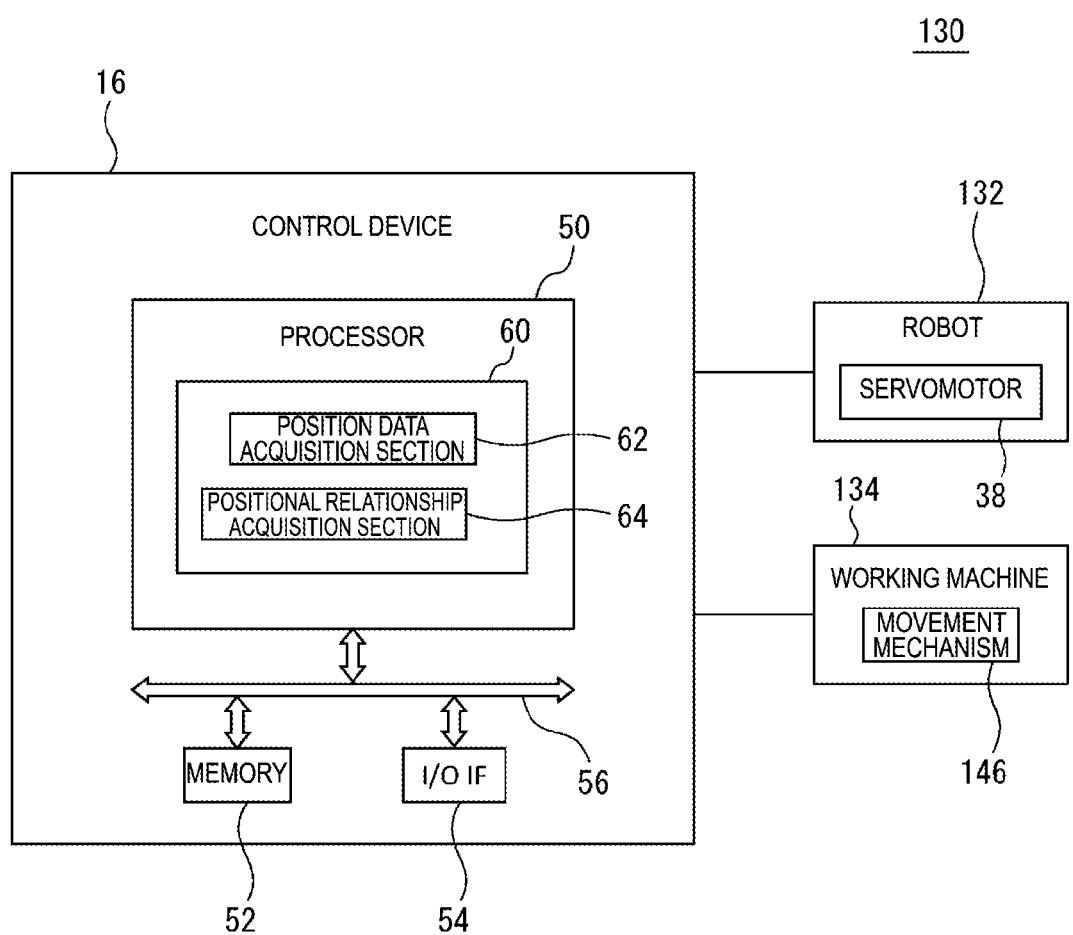
FIG. 18 is a block diagram of the system illustrated in FIG. 17.
Figure 19:
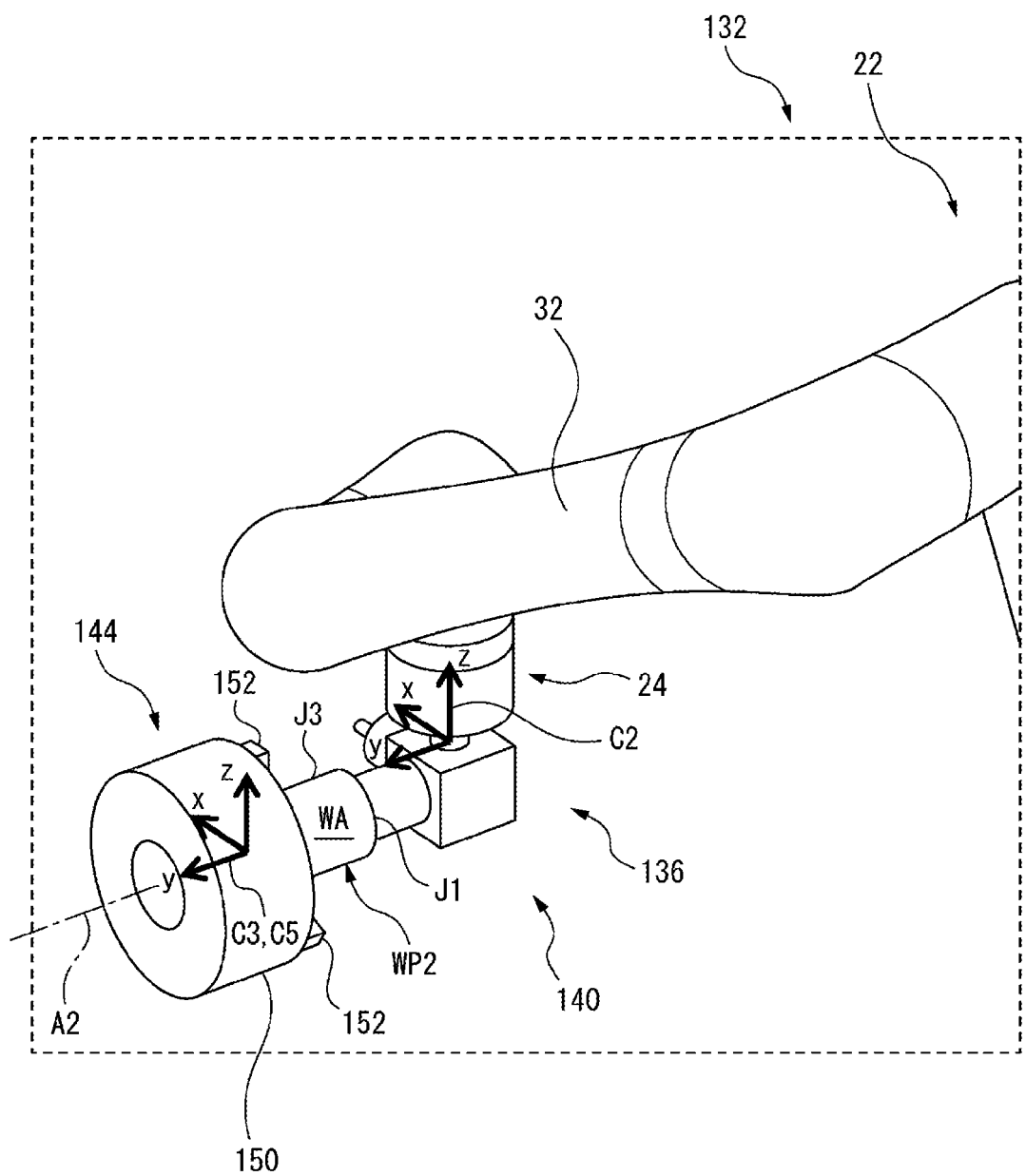
FIG. 19 is an enlarged view of a main portion of FIG. 17.
Figure 22:
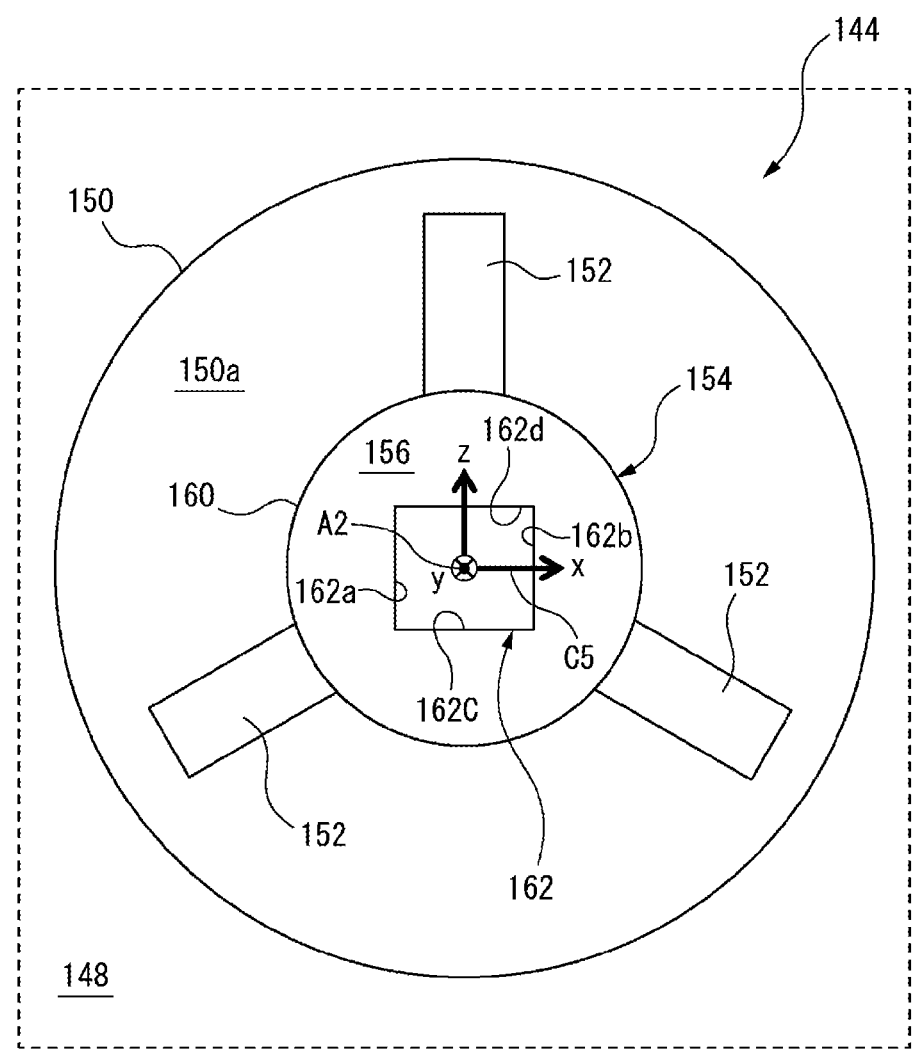
FIG. 22 is a front view of a workpiece holding mechanism and a contact portion illustrated in FIG. 17.
Figure 22:
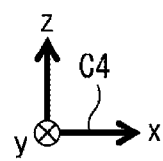

The end effector 136 grips the workpiece WP2 at a predetermined gripping position by gripping a position of the main body WA determined in advance. As illustrated in FIG. 17, FIG. 19, and FIG. 22, the workpiece WP2 gripped by the end effector 136 at the predetermined gripping position can be regarded as being integrated with the end effector 136, i.e., as part of the end effector 136. Thus, the leading end portion (wrist flange) of the wrist 24, the end effector 136, and the workpiece WP2 gripped by the end effector 136 at the predetermined gripping position forms a hand-tip portion 140 of the robot 132.

The user coordinate system C3 is set relative to the workpiece WP2 gripped by the end effector at the predetermined gripping position. In the present embodiment, the user coordinate system C3 is set relative to the workpiece WP2, with its origin arranged at the center point of the bottom surface B6 (FIG. 20) of the workpiece WP2 gripped by the end effector 26, with its x-z plane being parallel to the bottom surface B6 of the workpiece WP2 gripped by the end effector 26, and with its y-z plane being parallel to the side surfaces B7 and B8 of the workpiece WP2 gripped by the end effector 26.

As described above, the workpiece WP2 gripped by the end effector 136 at the predetermined gripping position can be regarded as being integrated with the end effector 136 (i.e., part of the end effector 136). Thus, when the gripping position and the shape of the workpiece WP2 are known, the positional relationship (the origin position and the direction of each axis) of the user coordinate system C3 set for the workpiece WP2 gripped by the end effector 136 relative to the MIF coordinate system C2 is known.

Thus, the positional relationship of the user coordinate system C3 relative to the robot coordinate system C1 is known through the MIF coordinate system C2. Thus, as in the above-described embodiment, the positional relationship of the user coordinate system C3 relative to the robot coordinate system C1 is represented as the coordinates D(X, Y, Z, W, P, R) of the robot coordinate system C1, and the coordinate transformation matrix M13 (and inverse transformation matrix M31 thereof) from the robot coordinate system C1 to the user coordinate system C3 is a known homogeneous transformation matrix.

The working machine 134 is a machine tool for example, and includes a main body 142, a workpiece holding mechanism 144, and a movement mechanism 146. The workpiece holding mechanism 144 is movably provided on a surface 148 of the main body 142. In the present embodiment, the workpiece holding mechanism 144 is a chuck mechanism. Specifically, as illustrated in FIG. 19, FIG. 21, and FIG. 22, the workpiece holding mechanism 144 includes a chuck base 150, a plurality of chuck claws 152 provided to the chuck base 150 to be openable and closable, and a chuck driver (not illustrated) that drives the chuck claws 152.

The chuck base 150 is a column-shaped member having a central axis A2, and includes a substantially flat holding surface 150a facing the outer side. The chuck claws 152 are provided to the chuck base 150 to be movable toward and away from the axis A2. In the present embodiment, three chuck claws 152 in total are arranged at a substantially equal interval around the axis A2. The chuck driver is, for example, a pneumatic or hydraulic cylinder, or is a motor, and opens and closes the chuck claws 152 under a command from the control device 16. An object gripped by the chuck claws 152 is held to be coaxial with the axis A2.

Figure 21:
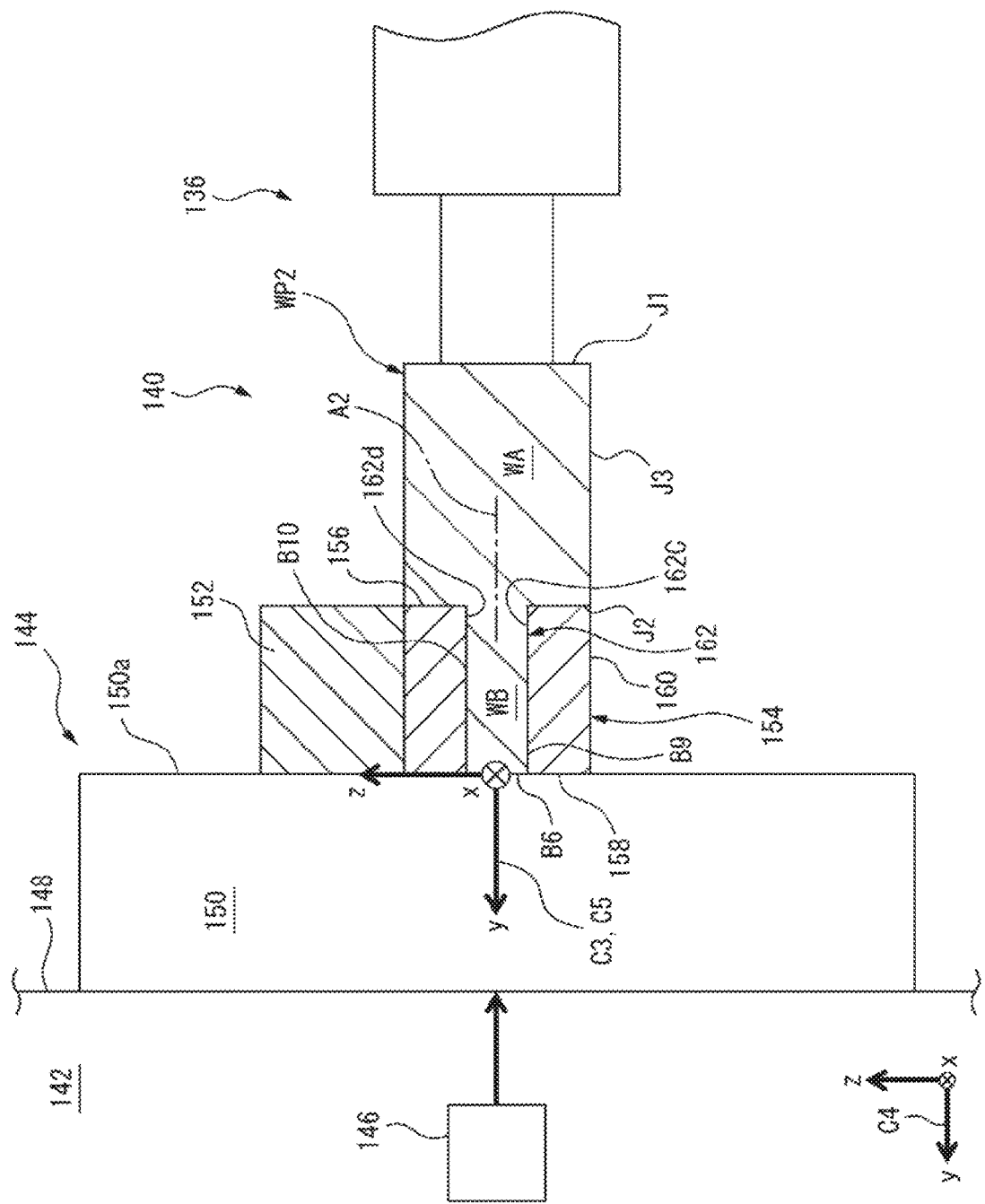
FIG. 21 is a cross-sectional view of the main portion of FIG. 17.

As illustrated in FIG. 21 and FIG. 22, in the present embodiment, a contact portion 154 is gripped in advance by the chuck claws 152. The contact portion 154 is a cylindrical member including a pair of end surfaces 156 and 158 that are each a substantially flat surface, an outer circumferential surface that is a cylindrical surface extending between the end surfaces 156 and 158, and a through hole that is formed through the contact portion 154 in the axial direction.

The through hole 162 has the same outer shape as the protrusion WB of the workpiece WP2, and slidably receives the protrusion WB as described below. More specifically, the through hole 162 is defined by inner surfaces 162a, 162b, 162c, and 162d that are each a substantially flat surface. The inner surfaces 162a and 162b are arranged to face each other, while being parallel to each other. The inner surfaces 162c and 162d are arranged to face each other, while being orthogonal to the inner surfaces 162a and 162b and being parallel to each other.

The movement mechanism 146 includes, for example, a ball screw mechanism and a servomotor that drives the ball screw mechanism (both not illustrated), and moves the workpiece holding mechanism 144 in the x-axis, the y-axis, and the z-axis directions of the working machine coordinate system C4 under a command from the control device 16. The movement coordinate system C5 is set for the workpiece holding mechanism 144.

The movement coordinate system C5 is for controlling the position of the workpiece holding mechanism 144 in the working machine coordinate system C4, and moves together with the workpiece holding mechanism 144 in the working machine coordinate system C4. In the present embodiment, the movement coordinate system C5 is set relative to the workpiece holding mechanism 144, with its origin arranged at an intersection between the axis A2 and the holding surface 150a (i.e., the center point of the holding surface 150a), and with its y-axis being orthogonal to the holding surface 150a.

In the present embodiment, the contact portion 154 is gripped by the chuck claws 152, while being oriented with its inner surfaces 162a and 162b being parallel to the y-z plane of the movement coordinate system C5, and with its inner surfaces 162c and 162d being parallel to the x-y plane of the movement coordinate system C5. As a result, the contact portion 154 integrally moves with the workpiece holding mechanism 144, while being held by the workpiece holding mechanism 144 to be coaxial with the axis A2.

Specifically, when moving the workpiece holding mechanism 144, the processor 50 sets the movement coordinate system C5 in the working machine coordinate system C4, and controls the movement mechanism 146 to arrange the workpiece holding mechanism 144 at a position defined by the movement coordinate system C5 thus set. Thus, the processor 50 can arrange the workpiece holding mechanism 144 to be at an arbitrary position in the working machine coordinate system C4.

The positional relationship of the movement coordinate system C5 relative to the working machine coordinate system C4 (i.e., the origin position and the direction of each axis) is known, and the movement coordinate system C5 is represented by the coordinates E(x, y, z, w, p, r) of the working machine coordinate system C4. The positions of the workpiece holding mechanism 144 and the contact portion 154 relative to the movement coordinate system C5 are known. Thus, the positions of the workpiece holding mechanism 144 and the contact portion 154 in the working machine coordinate system C4 are known through the movement coordinate system C5.

The function of the system 130 will be described below. First of all, the working machine 134 operates the movement mechanism 146 to arrange the workpiece holding mechanism 144 (i.e., the contact portion 154) at a predetermined position $PS_W$. The positional relationship between the working machine coordinate system C4 and the movement coordinate system C5 in this state is known as described above, and the coordinates of the movement coordinate system C5 in the working machine coordinate system C4 are represented as coordinates $E_5(x_5, y_5, z_5, w_5, p_5, r_5)$. Further, the coordinate transformation matrix $M45_{-3}$ from the working machine coordinate system C4 to the movement coordinate system C5 is a known homogeneous transformation matrix, and each parameter of the coordinate transformation matrix $M45_{-3}$ can be obtained from the coordinates $E_5(x_5, y_5, z_5, w_5, p_5, r_5)$.

Next, the robot 132 brings the workpiece WP2 gripped by the end effector 136 at the predetermined gripping position into contact with the contact portion 154 as illustrated in FIG. 17, FIG. 19, and FIG. 21. As a result, the protrusion WB of the workpiece WP2 fits in the through hole of the contact portion 154, with the bottom surface B6 of the protrusion WB being in surface contact with the holding surface 150a, the side surfaces B7 and B8 of the protrusion WB respectively being in surface contact with the inner surfaces 162a and 162b of the contact portion 154, and with the side surfaces B9 and B10 of the protrusion WB respectively being in surface contact with the inner surfaces 162c and 162d of the contact portion 154.

Thus, the hand-tip portion 140 is stationarily arranged at a predetermined position $PS_3$ and orientation $OR_3$, relative to the working machine 134. In this state, the user coordinate system C3 and the movement coordinate system C5 can be regarded as matching each other. In other words, the user coordinate system C3 and the movement coordinate system C5 can be regarded as having the origin positions and the directions of the x-axis, y-axis, and z-axis directions matching each other.

Thus, the positional relationship of the user coordinate system C3 relative to the working machine coordinate system C4 in this state is known, and the coordinates of the user coordinate system C3 in the working machine coordinate system C4 are represented by the above-described coordinates $E_5(x_5, y_5, z_5, w_5, p_5, r_5)$, and the coordinate transformation matrix $M43_{-3}$ from the working machine coordinate system C4 to the user coordinate system C3 is equal to the above-described coordinate transformation matrix $M45_{-3}$.

With the hand-tip portion 140 (specifically, the workpiece WP2) thus coming into contact with the contact portion 154, the hand-tip portion 140 is stationarily arranged at the predetermined position $PS_3$ and orientation $OR_3$ relative to the working machine 134. The positional relationship of the user coordinate system C3 relative to the working machine coordinate system C4 (i.e., the position $PS_3$ and orientation $OR_3$ of the hand-tip portion 140) in this state is known. Thus, the contact portion 154 functions as an element for representing the position $PS_3$ and orientation $OR_3$ of the hand-tip portion 140, in the working machine coordinate system C4.

Then, the processor 50 functions as the position data acquisition section 62 to acquire second position data $\beta_3$ indicating the position $PS_3$ and orientation $OR_3$ in the working machine coordinate system C4 when the hand-tip portion 140 is arranged at the position $PS_3$ and in the orientation $OR_3$. As an example, processor 50 acquires, as the second position data $\beta_3$, the coordinates $E_5(x_5, y_5, z_5, w_5, p_5, r_5)$, or the coordinate transformation matrix $M43_{-3}$ described above.

As another example, the processor 50 may acquire, as the second position data $\beta_3$, a coordinate transformation matrix $M34_{-3}=\text{inv}(M43_{-3})$ from the user coordinate system C3 to the working machine coordinate system C4, or coordinates $E_5'(x_5', y_5', z_5', w_5', p_5', r_5')$ of the working machine coordinate system C4 in the user coordinate system C3, when the hand-tip portion 140 is arranged at the position $PS_3$ and in the orientation $OR_3$.

On the other hand, the processor 50 acquires first position data $\alpha_3$ indicating the position $PS_3$ and orientation $OR_3$ in the robot coordinate system C1 when the hand-tip portion 140 is arranged at the position $PS_3$ and in the orientation $OR_3$. As an example, the processor 50 acquires, as the first position data $\alpha_3$, coordinates $D_5(X_5, Y_5, Z_5, W_5, P_5, R_5)$ of the user coordinate system C3 in the robot coordinate system C1 or a coordinate transformation matrix $M13_{-3}$ from the robot coordinate system C1 to the user coordinate system C3 when the hand-tip portion 140 is arranged at the position $PS_3$ and the in the orientation $OR_3$.

As another example, the processor 50 may acquire, as the first position data $\alpha_3$, coordinates $D_5'(X_5', Y_5', Z_5', W_5', P_5', R_5')$ of the robot coordinate system C1 in the user coordinate system C3, or a coordinate transformation matrix $M31_{-3}$ from the user coordinate system C3 to the robot coordinate system C1, when the hand-tip portion 140 is arranged at the position $PS_3$ and in the orientation $OR_3$.

Next, using the first position data $\alpha_3$ and the second position data $\beta_3$ acquired, the processor 50 functions as the positional relationship acquisition section 64 to acquire third position data $\gamma_3$ indicating the positional relationship between the robot coordinate system C1 and the working machine coordinate system C4. As an example, the processor 50 obtain, by an arithmetic processing, as the third position data $\gamma_3$, a coordinate transformation matrix $M14_{-3}$ from the robot coordinate system C1 to the working machine coordinate system C4, from a formula $M14_{-3}=M13_{-3}zM34_{-3}=M13_{-3}z\text{inv}(M43_{-3})$.

As another example, the processor 50 may acquire, as the third position data $\gamma_3$, a coordinate transformation matrix $M41_{-3}$ $(=\text{inv}(M14_{-3}))$ from the working machine coordinate system C4 to the robot coordinate system C1, coordinates $D_6(X_6, Y_6, Z_6, W_6, P_6, R_6)$ of the working machine coordinate system C4 in the robot coordinate system C1, or coordinates $E_6(x_6, y_6, z_6, w_6, p_6, r_6)$ of the robot coordinate system C1 in the working machine coordinate system C4.

As described above, according to the present embodiment, the processor 50 can acquire the third position data $\gamma_3$ by arranging the hand-tip portion 140 at one position $PS_3$ and in one orientation $OR_3$, without executing a process of touching up a plurality of points set to the working machine 134 using the hand-tip portion 140. Thus, the process of obtaining the positional relationship between the robot coordinate system C1 and the working machine coordinate system C4 can be largely simplified.

Note that the contact detection sensor 92 described above can be applied to the system 130. For example, the first sensor element 94 of the contact detection sensor 92 is provided in the center portion of the holding surface 150a (or the bottom surface B6 of the workpiece WP2) of the workpiece holding mechanism 144, the second sensor element 96 is provided on the inner surface 162a or 162b of the contact portion 154 (or the side surface B7 or B8 of the workpiece WP2), and the third sensor element 98 is provided on the inner surface 162c or 162d of the contact portion 154 (or the side surface B9 or B10 of the workpiece WP2).

In this case, the processor 50 may execute the flow illustrated in FIG. 12. For example, in step S1, the processor 50 may arrange the initial position $PS_0$ and the initial orientation $OR_0$ such that at least part of the protrusion WB of the workpiece WP2 is fit in the through hole 162 of the contact portion 154. In step S2, the processor 50 may move the hand-tip portion 140 in the y-axis direction (i.e., the direction expected to be orthogonal to the holding surface 150a) of the user coordinate system C3 at this point.

In step S4, the processor 50 may move the hand-tip portion 140 in the x-axis direction (i.e., the direction expected to be orthogonal to the inner surface 162a or 162b) of the user coordinate system C3 at this point. In step S6, the processor 50 may move the hand-tip portion 140 in the z-axis direction (i.e., the direction expected to be orthogonal to the inner surface 162c or 162d) of the user coordinate system C3 at this point. In this manner, the processor 50 can automatically execute the operation to bring the hand-tip portion 140 into contact with the contact portion 154 and arrange the hand-tip portion 140 in the predetermined position $PS_3$ and orientation $OR_3$ by executing the flow illustrated in FIG. 12.

The displacement data acquisition section 108 and the correction section 110 described above may be applied to the system 130. For example, the processor 50 acquires the first position data $\alpha_3$ (e.g., coordinates $D_5$) or the second position data $\beta_3$ (e.g., the coordinates $E_5$) before and after relocation of the system 130 or the replacement of the robot 132 or the working machine 134 (or when the simulation is applied to the actual machine).

Then, the processor 50 may function as the displacement data acquisition section 108 to calculate a difference between two pieces of position data acquired before and after the relocation or replacement using the method, which is the same as that used in the system 100 described above, to acquire the displacement data Δ indicating a difference between a relative position RP5 before the relocation or replacement and a relative position RP6 after the relocation or replacement. Then, the processor 50 may function as the correction section 110 to correct the operation program OP generated before the relocation or replacement, using the displacement data Δ acquired.

The position detection sensor 122 (touch probe) described above may be applied to the system 130. Specifically, the position detection sensor 122 is fixed to the workpiece holding mechanism 144 of the working machine 134 (e.g., gripped by the chuck claws 152). Then, the processor 50 arranges the hand-tip portion 140 at a predetermined position $PS_4$ and orientation $OR_4$.

Next, the processor 50 operates the movement mechanism 146 to move the position detection sensor 122 and make the detection point 122a of the position detection sensor 122 touch up (contact) a plurality of positions of the hand-tip portion 140 (workpiece WP2). For example, the processor 50 operates the movement mechanism 146 to sequentially touch up, using the detection point 122a, three points PT1, PT2, and PT3 on the side surface B7 (or B8) of the workpiece WP2 gripped by the end effector 136.

Next, the processor 50 operates the movement mechanism 146 to sequentially touch up, using the detection point 122a, two points PT4 and PT5 on the side surface B9 (or B10) of the workpiece WP2 gripped by the end effector 136. Next, the processor 50 operates the movement mechanism 146 to touch up, using the detection point 122a, one point P6 on the bottom surface B6 of the workpiece WP2 gripped by the end effector 136.

Then, the processor 50 can identify the position and orientation (i.e., the origin position and the direction of each axis of the user coordinate system C3) of the workpiece WP2 (hand-tip portion 140) in the working machine coordinate system C4 based on the detection data DP1 to DP6 received from the position detection sensor 122 when the detection point 122a touches up the six respective points PT1 to PT6, as with the system 120 described above, and thus acquire the second position data $\beta_4$.

When the position detection sensor 122 is applied to the system 130 in this manner, the processor may acquire the second position data $\beta_4$ (e.g., the coordinates E of the user coordinate system C3 in the working machine coordinate system C4) using the position detection sensor 122 before and after the system 130 is relocated or the robot 132 or the working machine 134 is replaced (or when the simulation is applied to the actual machine).

Then, using a method similar to that in the system 100 described above, the processor 50 may function as the displacement data acquisition section 108 to calculate a difference between the two pieces of second position data $\beta_4$ acquired before and after the relocation or the replacement (or when the simulation is applied to the actual machine), whereby displacement data $\Delta_{E3}$ (or $\Delta_{E1}$) indicating a difference between the relative position RP5 before the relocation or the replacement (or the relative position RP1 at the time of execution of the simulation) and the relative position RP6 after the relocation or the replacement (or the relative position RP2 after the system 130 is constructed in the real space) may be acquired.

For example, the processor 50 acquires coordinates $E_7(x_7, y_7, z_7, w_7, p_7, r_7)$ of the user coordinate system C3 in the working machine coordinate system C4 as the second position data $\beta_4$ with the relative position RP5 before the relocation or the replacement (or at the time of execution of the simulation), and acquires coordinates $E_5(x_5, y_5, z_5, w_5, p_5, r_5)$ of the user coordinate system C3 in the working machine coordinate system C4 as the second position data $\beta_4$ with the relative position RP6 after the relocation or the replacement (or after the system 130 is constructed in the real space).

Then, the processor 50 functions as the displacement data acquisition section 108 to acquire a difference $\Delta_{E3}=E_8-E_7$ between the coordinates $E_7$ and the coordinates $E_8$ as the displacement data $\Delta_{E3}$. The processor 50 may function as the correction section 110 to correct an operation program OP5 of the working machine 134 generated before the relocation or the replacement (or at the time of execution of the simulation) using the acquired displacement data $\Delta_{E3}$ (=$E_8-E_7$). Specifically, using the acquired displacement data Δ, the processor 50 may correct the teaching point of the above-described position $PS_W$ defined in the operation program OP5 of the working machine 134, to generate a new operation program OP6.

Note that the position $PS_3$ and orientation $OR_3$ for arranging the hand-tip portion 140 in the system 130 may be a target position and orientation for the robot 132 to perform predetermined work (such as handling of a workpiece) on the working machine 134 in an actual manufacturing process. For example, in the actual manufacturing process, the processor 50 operates the movement mechanism 146 of the working machine 134 to arrange the workpiece holding mechanism 144 at the predetermined position $PS_W$.

Then, the processor 50 operates the robot 132 to make the chuck claws 152 of the workpiece holding mechanism 144 arranged at the position $PS_W$ grip the workpiece gripped by the end effector at the predetermined gripping position, to hand over the workpiece to the workpiece holding mechanism 144. Next, the processor 50 operates the working machine 134 to process the workpiece using a tool while moving the workpiece held by the workpiece holding mechanism 144 by the movement mechanism 146.

After the workpiece is processed, the processor 50 operates the movement mechanism 146 of the working machine 134 to arrange the workpiece holding mechanism 144 at the position $PS_W$ again, and operates the robot 132 to receive, using the end effector 136, the processed workpiece held by the workpiece holding mechanism 144.

In such a series of manufacturing processes, the predetermined position $PS_3$ and orientation $OR_3$ described above may be set such that the target position and orientation for the robot 132 to perform the work of handling a workpiece for the working machine 134 (i.e., handling over the workpiece to the workpiece holding mechanism 144 and receiving the workpiece from the workpiece holding mechanism 144) match the predetermined position $PS_3$ and orientation $OR_3$. The processor 50 may generate an operation program OP7 for making the robot 132 and the working machine 134 cooperate to execute a series of manufacturing processes, using the position data on the predetermined position $PS_3$ and orientation $OR_3$ and the third position data $\gamma_3$ acquired.

With this configuration, the third position data $\gamma_3$ can be acquired in a state in which the hand-tip portion 140 (end effector 136) is arranged at the target position and orientation. Thus, in the actual manufacturing process, the robot 132 can execute work on the working machine 134 (such as handling of a workpiece) with high accuracy. Note that predetermined position $PS_1$ and orientation $OR_1$ in the system 10 described above, or the predetermined position $PS_2$ and orientation $OR_2$ in the system 120 may similarly be set as the target position and orientation for the robot 12 to perform a predetermined operation on the working machine 14.

Note that, in the system 130, the movement mechanism 146 may be omitted, and the workpiece holding mechanism 144 may be fixed to a known position $PS_W$ in the working machine coordinate system C4. In this case, the positional relationship of the user coordinate system C3 relative to the working machine coordinate system C4 when the workpiece WP2 in the hand-tip portion 140 comes into contact with the contact portion 154 can be known as the positional relationship illustrated in FIG. 21.

In a case where the movement mechanism 146 is omitted from the system 130, the working machine 134 may further include a tool that processes the workpiece held by the workpiece holding mechanism 144 and a movement mechanism (both not illustrated) that moves the tool relative to the workpiece holding mechanism 144, and the movement mechanism may move the position detection sensor 122 (touch probe) described above, with the position detection sensor 122 fixed to the tool.

In this case, the processor 50 may acquire the second position data $\beta_4$ by making the movement mechanism move the position detection sensor 122 in a state where the hand-tip portion 140 of the robot 132 is arranged at the predetermined position $PS_3$ and orientation $OR_3$ to touch up arbitrary points PT1 to PT6 of the hand-tip portion 140 using the detection point 122a. The position $PS_3$ and orientation $OR_3$ at and in which the hand-tip portion 140 is arranged may be the target position and orientation described above.

In the system 130, the contact portion 154 and the workpiece WP2 may be configured in such a manner that an assembly of the contact portion 154 and the workpiece WP2 fit to each other as illustrated in FIG. 21 has the same shape (dimensions) as a workpiece WP3 to be a target of the work in the actual manufacturing process. The third position data $\gamma_3$ acquired with this configuration is equivalent to that acquired using the workpiece WP3 used in the actual manufacturing process. Thus, the accuracy of the handling of the workpiece by the robot 132 in the actual manufacturing process can be further improved.

In the system 130, the third position data $\gamma_3$ may be acquired using the workpiece WP3 that is the target of the work in the actual manufacturing process, instead of the contact portion 154 and the workpiece WP2. This function will be described below with reference to FIG. 23 and FIG. 24. The workpiece WP3 is a column-shaped member, and includes a pair of end surfaces K1 and K2 and an outer circumferential surface K3.

The end effector 136 grips the workpiece WP3 at a predetermined gripping position by gripping a position of the workpiece WP3 determined in advance. In this case, the leading end portion (wrist flange) of the wrist 24, the end effector 136, and the workpiece WP3 gripped by the end effector 136 at the predetermined gripping position forms a hand-tip portion 140' of the robot 132.

The user coordinate system C3 is set relative to the workpiece WP3 gripped by the end effector at the predetermined gripping position. In the present embodiment, the user coordinate system C3 is set relative to the workpiece WP3, with its origin arranged at the center point of an end surface K2 of the workpiece WP3 gripped by the end effector 26, and with its x-z plane being parallel to the end surface K2 of the workpiece WP3 gripped by the end effector 26.

The processor 50 operates the robot 132 to bring the end surface K2 of the workpiece WP3 into contact with the holding surface 150a of the workpiece holding mechanism 144 and operates the chuck driver to grip the workpiece WP3 with the chuck claws 152. As a result, the hand-tip portion 140' is held by the workpiece holding mechanism 144 to be stationary arranged at the predetermined position $PS_3$ and orientation $OR_3$.

In this state, the origin of the user coordinate system C3 is arranged at the center point of the holding surface 150a (i.e., the origin of the movement coordinate system C5), and the y-axis of the user coordinate system C3 is in a direction orthogonal to the holding surface 150a. Here, in the present embodiment, the processor 50 maintains the orientation of the hand-tip portion 140' when the end surface K2 of the workpiece WP3 comes into contact with the holding surface 150a, in a known orientation in the work coordinate system C4.

For example, the processor 50 maintains the orientation of the hand-tip portion 140' when the workpiece WP3 comes into contact with the holding surface 150a in an orientation with the z-axis positive direction of the user coordinate system C3 matching the vertically upward direction. In this case, when the workpiece WP3 is gripped by the chuck claws 152 and the hand-tip portion 140' is arranged at the position $PS_3$ and in the orientation $OR_3$, the orientation of the hand-tip portion 140' is maintained in an orientation with the z-axis positive direction of the user coordinate system C3 matching the vertically upward direction.

On the other hand, in the work coordinate system C4, the vertically upward direction (e.g., the z-axis positive direction of the work coordinate system C4) can be identified. Thus, it is possible to identify the z-axis direction of the user coordinate system C3 in the work coordinate system C4 when the hand-tip portion 140' is arranged at the position $PS_3$ and in the orientation $OR_3$. Thus, the origin position, the y-axis direction, and the z-axis direction of the user coordinate system C3 in the work coordinate system C4 can be identified. Thus, the positional relationship of the user coordinate system C3 relative to the work coordinate system C4 (i.e., the position and orientation of the hand-tip portion 140') can be known.

According to the present embodiment, the orientation of the hand-tip portion 140' when the hand-tip portion 140' is arranged at the position $PS_3$ and in the orientation $OR_3$ is set to be a known orientation in the work coordinate system C4. Thus, the second position data $\beta_3$ indicating the position and orientation of the hand-tip portion 140' in the work coordinate system C4 can be acquired without using the contact portion 154 and the workpiece WP2 illustrated in FIG. 21.

Note that the processor 50 may maintain the orientation of the hand-tip portion 140' when the workpiece WP3 comes into contact with the holding surface 150a in an orientation with which the z-axis positive direction of the user coordinate system C3 matches the vertically downward direction known in the work coordinate system C4, or in an orientation with which the x-axis positive direction of the user coordinate system C3 matches a horizontally left (or right) direction known in the work coordinate system C4.

Figure 23:
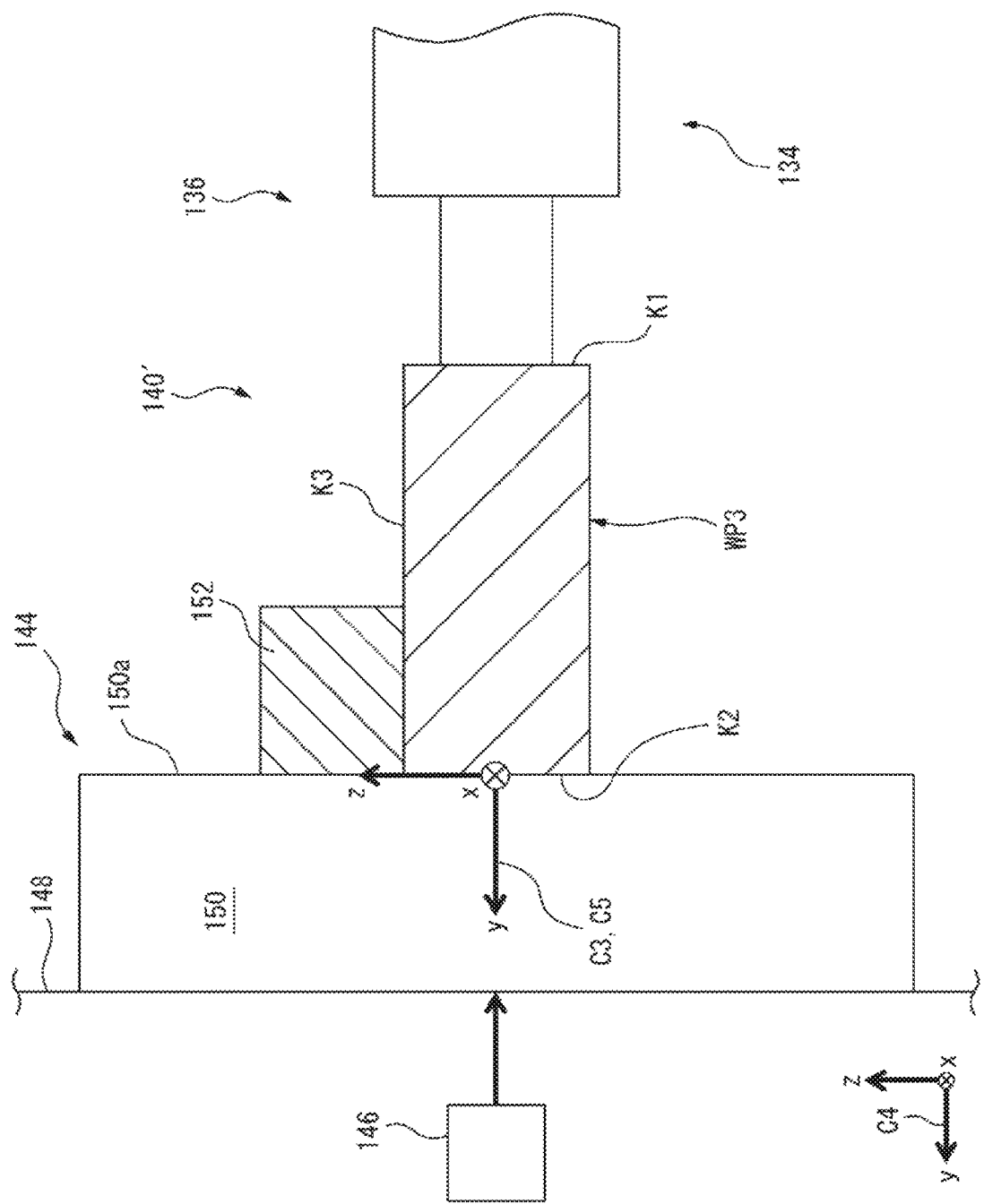
FIG. 23 is a cross-sectional view illustrating a state where a workpiece according to another embodiment is gripped by a robot hand and held by the workpiece holding mechanism illustrated in FIG. 17.
Figure 24:
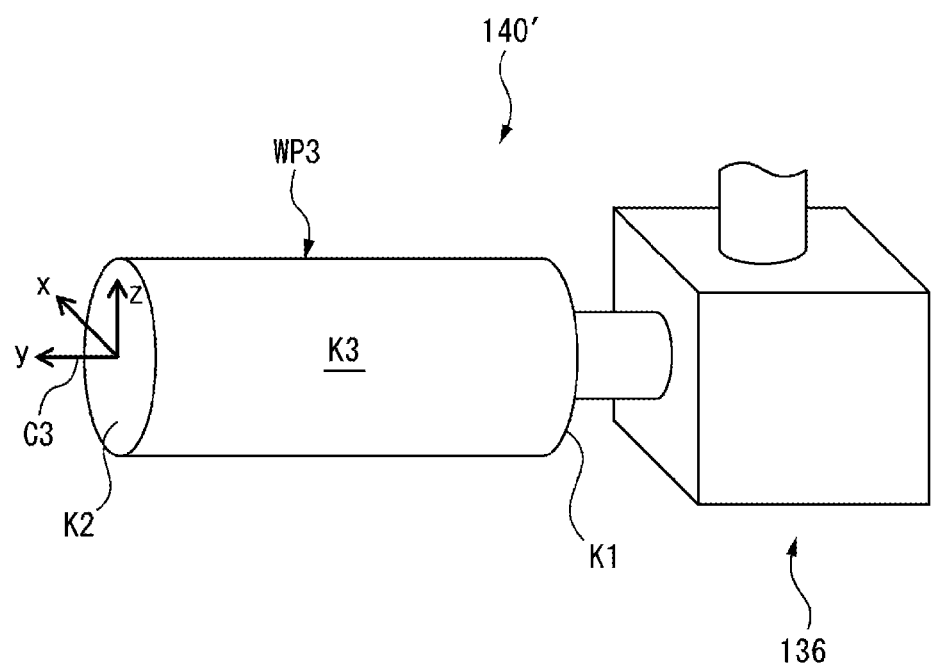
FIG. 24 is an enlarged perspective view of the workpiece illustrated in FIG. 23 and the robot hand gripping the workpiece.

Note that in a state illustrated in FIG. 23, the outer circumferential surface K3 of the workpiece WP3 is in contact with the chuck claws 152 and the end surface K2 of the workpiece WP3 is in contact with the holding surface 150a, and thus the hand-tip portion 140' is stationary arranged at the position $PS_3$ and in the orientation $OR_3$, whereby the position and orientation of the hand-tip portion 140' in the work coordinate system C4 are known. Thus, in the present embodiment, the chuck claws 152 and the holding surface 150a of the workpiece holding mechanism 144 function as the contact portion.

The teaching device 72 illustrated in FIG. 7 or the force sensor 82 illustrated in FIG. 9 may be applied to the system 130, and the operator may teach the robot 132 about an operation to bring the hand-tip portion 140 (or 140') into contact with the contact portion 154 (or the workpiece holding mechanism 144) and arrange the hand-tip portion 140 (or 140') at the predetermined position $PS_3$ and orientation $OR_3$. In this case, the processor 50 of the system 130 functions as the teaching command receiving section 78 and the robot control section 79 described above.

The system 130 may include a first control device 16A that controls the robot 132 and a second control device 16B that is communicably connected to the first control device 16A and controls the working machine 134. In this case, the processor 50 of any one of the control devices 16A and 16B may function as the position data acquisition section 62 and the positional relationship acquisition section 64. Alternatively, the processor 50 of the first control device 16A may function as one of the position data acquisition section 62 and the positional relationship acquisition section 64, and the processor 50 of the second control device 16B may function as the other one of the position data acquisition section 62 and the positional relationship acquisition section 64.

Note that in the system 10, 70, 70', 80, 90, 100, 120 or 130 described above, the processor 50 may automatically execute the process of acquiring the first position data α, the second position data β, and the third position data γ according to a computer program. In this case, the computer program causes the processor 50 to function as the position data acquisition section 62 and the positional relationship acquisition section 64.

In the embodiments described above, a case is described where the end effectors 26 and 136 are robot hands that can grip a workpiece. However, this should not be construed in a limiting sense, and the end effector 26 or 136 may be any type of end effector capable of executing predetermined work (e.g., processing, welding, paint coating, or the like).

In the embodiments described above, a case is described where the leading end portion of the wrist 24, the end effector 26, 136, and the workpiece WP1, WP2, WP3 gripped by the end effector 26, form the hand-tip portion 40, 140, 140'. However, the end effector 26, 136 does not necessarily need to grip the workpieces WP1, WP2, WP3. In this case, the leading end portion of the wrist 24 and the end effector 26, 136 form the hand-tip portion 40B, 140B.

Regarding the hand-tip portion 40B, in the end effector 26 illustrated in FIG. 3, for example, the user coordinate system C3 may be set relative to the end effector 26, with its origin arranged at one vertex of one gripping surface 36a, and with its y-z plane being parallel to the one gripping surface 36a. In this case, the claw parts 36 of the end effector 26 may come into contact with the contact portion 44, to arrange the hand-tip portion 40B at a predetermined position and orientation. Also in this case, the positional relationship (position and orientation of the hand-tip portion 40B) of the user coordinate system C3 relative to the working machine coordinate system C4 can be known using the same principle as the embodiment described above.

Regarding the hand-tip portion 140B, in the end effector 136 illustrated in FIG. 19, for example, the user coordinate system C3 may be set relative to the end effector 136, with its origin arranged at an object gripping position (e.g., a position between a plurality of fingers or the center of a adsorption surface of a adsorption portion), and with its z-axis being parallel (specifically, matching) to the wrist axis A1 (FIG. 1).

In this case, the hand-tip portion 140B may be arranged at the predetermined position and orientation with an arbitrary portion (finger, or adsorption portion) of the end effector 136 in contact with the workpiece holding mechanism 144 serving as the contact portion and held by the workpiece holding mechanism 144. Also in this case, the positional relationship (position and orientation of the hand-tip portion 140B) of the user coordinate system C3 relative to the working machine coordinate system C4 can be known using the same principle as the embodiment described above.

Regarding the hand-tip portion 40B, 140B, the sensor element 94, 96, 98 described above may be provided to the leading end portion of the wrist 24 or the end effector 26, 136, and the hand-tip portion 40B, 140B may come into contact with the contact portion 44, 154 and be arranged at the predetermined position and orientation. The hand-tip portion 40, 140, 140' may be, for example, formed only by the leading end portion of the wrist 24 (wrist flange) or may be defined as any portion of the robot 12.

The contact portion 44, 154 described above is an example which is used to make the position PS and orientation OR of the hand-tip portion 40, 40B, 140, 140B of the robot 12 relative to the working machine coordinate system C4 to be known, and the contact portion may have any shape as long as it can be used for making the position PS and orientation OR of the hand-tip portion 40, 40B, 140, 140B of the robot 12 relative to the working machine coordinate system C4 to be known.

The hand-tip portion 40, 40B, 140, 140B, instead of the contact portion 44, 154, may be brought into contact with an arbitrary portion (a hole, a recess, or a protrusion) of the robot 12 or the working machine 14 the position of which in the working machine coordinate system C4 is known, whereby arranging at the predetermined position PS and orientation OR may be performed.

The user coordinate system C3 is not limited to the embodiments described above, and may be set to be at any position the positional relationship of which relative to the MIF coordinate system C2 is known. For example, in the mode illustrated in FIG. 3, the origin of the user coordinate system C3 may be set to a vertex of the workpiece WP1 other than the vertex F or to the center point of the bottom surface B1 or the top surface B2.

In the embodiments described above, a case is described where the processor 50 acquires data indicating the positional relationship of the user coordinate system C3 relative to the working machine coordinate system C4, as the second position data β. However, this should not be construed in a limiting sense, and the processor 50 may acquire data indicating the positional relationship of the MIF coordinate system C3 relative to the working machine coordinate system C4, as the second position data β. Using the method described above, the positional relationship of the MIF coordinate system C3 relative to the working machine coordinate system C4 can be known when the shape of the workpiece WP1, WP2, WP3 and the position at which the end effector 26, 136 grips the workpiece WP1, WP2, WP3 are known.

Although the present disclosure is described above through the embodiments, the above-described embodiments do not limit the invention according to the claims.

REFERENCE SIGNS LIST

10, 70, 70', 80, 90, 100, 120, 130 System
12, 132 Robot
14, 134 Working machine
16 Control device
40, 140, 140' Hand-tip portion
44, 154 Contact portion
60 Device
62 Position data acquisition section
64 Positional relationship acquisition section
78 Teaching command receiving section
79 Robot control section
92 Contact detection sensor
108 Displacement data acquisition section
110 Correction section
122 Position detection sensor

The invention claimed is:

1. A device configured to acquire a positional relationship between a robot coordinate system set for a robot and a working machine coordinate system set for a working machine disposed outside the robot, the device comprising a processor configured to:
acquire first position data indicating a position and orientation of a hand-tip portion of the robot relative to the robot coordinate system and second position data indicating a position and orientation of the hand-tip portion relative to the working machine coordinate system, when the hand-tip portion is arranged at a same predetermined position and orientation relative to the working machine for the first position data and the second position data;
acquire the positional relationship based on the first position data and the second position data; and
control the robot and the working machine based on the acquired positional relationship.

2. The device of claim 1, wherein the processor is configured to operate the robot so as to bring the hand-tip portion into contact with a contact portion provided at a known position in the working machine coordinate system to arrange the hand-tip portion at the same predetermined position and orientation, the contact portion being provided for representing the same predetermined position and orientation in the working machine coordinate system.

3. The device of claim 2, wherein the robot or the working machine includes a contact detection sensor configured to detect that the hand-tip portion is in contact with the contact portion, and wherein the processor executes an operation to arrange the hand-tip portion at the same predetermined position and orientation, based on detection data from the contact detection sensor.

4. The device of claim 1, wherein the processor acquires the second position data based on detection data from a position detection sensor configured to detect the position of the hand-tip portion in the working machine coordinate system.

5. A device configured to acquire a positional relationship between a robot coordinate system set for a robot and a working machine coordinate system set for a working machine disposed outside the robot, the device comprising a processor configured to:
acquire first position data indicating a position and orientation of a hand-tip portion of the robot relative to the robot coordinate system and second position data indicating a position and orientation of the hand-tip portion relative to the working machine coordinate system, when the hand-tip portion is arranged at a predetermined position and orientation relative to the working machine;
acquire the positional relationship based on the first position data and the second position data; and
control the robot and the working machine based on the acquired positional relationship wherein the working machine includes a movement mechanism, and
wherein a position detection sensor includes a touch probe configured to detect the position of the hand-tip portion in the working machine coordinate system, by being moved by the movement mechanism so as to come into contact with the hand-tip portion arranged at the predetermined position and orientation.

6. The device of claim 1, wherein the processor is configured to receive a teaching command for arranging the hand-tip portion at the same predetermined position and orientation.

7. The device of claim 6, wherein the teaching command includes a direct teaching command for moving the hand-tip portion in response to external force applied to the robot.

8. The device of claim 1, wherein the same predetermined position and orientation are a target position and orientation when the robot performs predetermined work on the working machine.

9. The device of claim 1, wherein the processor is configured to acquire, based on the first position data or the second position data acquired before and after a change in relative position of the robot and the working machine occurs, displacement data indicating a difference between the relative position before the change and the relative position after the change.

10. The device of claim 9, wherein the processor is configured to correct an operation program for causing the robot or the working machine to execute a predetermined operation at the relative position before the change, using the acquired displacement data.

11. A device configured to acquire a positional relationship between a robot and a working machine, the device comprising a processor configured to:
   acquire the positional relationship based on first position data indicating a position and orientation of a hand-tip portion of the robot relative to the robot and second position data indicating a position and orientation of the hand-tip portion relative to the working machine when the hand-tip portion comes into contact with a contact portion at a same predetermined position and orientation relative to the working machine for the first position data and the second position data; and
   control the robot and the working machine based on the acquired positional relationship.

12. A control device for a robot or a working machine, the control device comprising the device of claim 1.

13. A system comprising:
   a robot;
   a working machine disposed outside the robot; and
   the control device of claim 12.

14. A method of acquiring a positional relationship between a robot coordinate system set for a robot and a working machine coordinate system set for a working machine disposed outside the robot, the method comprising:
   acquiring first position data indicating a position and orientation of a hand-tip portion of the robot relative to the robot coordinate system and second position data indicating a position and orientation of the hand-tip portion relative to the working machine coordinate system, when the hand-tip portion is arranged at a same predetermined position and orientation relative to the working machine for the first position data and the second position data;
   acquiring the positional relationship based on the first position data and the second position data acquired; and
   controlling the robot and the working machine based on the acquired positional relationship.

15. A method of acquiring a positional relationship between a robot and a working machine, the method comprising acquiring the positional relationship based on first position data indicating a position and orientation of a hand-tip portion of the robot relative to the robot and second position data indicating a position and orientation of the hand-tip portion relative to the working machine when the hand-tip portion comes into contact with a contact portion at a same predetermined position and orientation relative to the working machine for the first position data and the second position data; and
   controlling the robot and the working machine based on the acquired positional relationship.

16. A computer-readable non-transitory storage medium configured to store a computer program configured to, in order to acquire a positional relationship between a robot coordinate system set for a robot and a working machine coordinate system set for a working machine disposed outside the robot, cause a processor to:
   acquire first position data indicating a position and orientation of a hand-tip portion of the robot relative to the robot coordinate system and second position data indicating a position and orientation of the hand-tip portion relative to the working machine coordinate system, when the hand-tip portion is arranged at a same predetermined position and orientation relative to the working machine for the first position data and the second position data; and
   acquire the positional relationship based on the first position data and the second position data, wherein the robot and working machine are controlled based on the acquired positional relationship.

17. A computer-readable non-transitory storage medium configured to store a computer program configured to cause a processor to execute the method of claim 15.

* * * * *